(12) United States Patent
Allman et al.

(10) Patent No.: US 8,356,373 B2
(45) Date of Patent: Jan. 22, 2013

(54) UNITARY COMPOSITE/HYBRID CUSHIONING STRUCTURE(S) AND PROFILE(S) COMPRISED OF A THERMOPLASTIC FOAM(S) AND A THERMOSET MATERIAL(S)

(75) Inventors: Michael Allman, Wilson, NC (US); Bangshu Cao, Raleigh, NC (US); Andrew Costas Yiannaki, Raleigh, NC (US); Ivan Sobran, Raleigh, NC (US); Randal Lee Henderson, Zebulon, NC (US)

(73) Assignee: Noel Group LLC, Zebulon, NC (US)

( * ) Notice: Subject to any disclaimer, the term of this patent is extended or adjusted under 35 U.S.C. 154(b) by 149 days.

(21) Appl. No.: 12/716,804

(22) Filed: Mar. 3, 2010

(65) Prior Publication Data

US 2010/0223732 A1  Sep. 9, 2010

Related U.S. Application Data

(60) Provisional application No. 61/157,970, filed on Mar. 6, 2009.

(51) Int. Cl.
*A47C 27/14* (2006.01)
*A47C 27/15* (2006.01)

(52) U.S. Cl. .......... 5/740; 5/727; 5/736; 5/739; 5/655.9; 5/953

(58) Field of Classification Search .................. 5/655.9, 5/652, 690, 740, 739, 727, 728, 731, 736, 5/944, 953
See application file for complete search history.

(56) References Cited

U.S. PATENT DOCUMENTS

| 2,604,642 A | 7/1952 | Marco |
| 2,659,418 A | 11/1953 | Berman |
| 2,835,906 A | 5/1958 | Robbins |
| 2,917,807 A | 12/1959 | Scholl |

(Continued)

FOREIGN PATENT DOCUMENTS

| DE | 3937214 A1 | 5/1991 |
| EP | 0349620 A1 | 1/1990 |

(Continued)

OTHER PUBLICATIONS

Smock, D., "One-step SkinForm process went live at NPE2012," Plasticstoday.com, Apr. 13, 2012, 2 pages, Accessed Apr. 18, 2012.

(Continued)

*Primary Examiner* — Robert G Santos
(74) *Attorney, Agent, or Firm* — Withrow & Terranova, PLLC

(57) ABSTRACT

Embodiments disclosed in the detailed description include a unitary or monolithic composite or hybrid cushioning structure(s) and profile(s) comprised of a cellular thermoplastic foam and a thermoset material. The thermoset material may also be provided as cellular foam as well. In one embodiment disclosed herein, the unitary composite cushioning structure is formed from a cellular thermoplastic foam and a thermoset material. The cellular thermoplastic foam provides support characteristics to the unitary composite cushioning structure. The thermoset material provides a resilient structure with cushioning characteristics to the cushioning structure. A stratum is disposed between at least a portion of the cellular thermoplastic foam and at least a portion of the thermoset material to secure the at least a portion of the thermoset material to the at least a portion of the cellular thermoplastic foam to provide a unitary composite cushioning structure.

39 Claims, 18 Drawing Sheets

U.S. PATENT DOCUMENTS

| | | | |
|---|---|---|---|
| 2,955,056 A | 10/1960 | Knox | |
| 3,026,544 A | 3/1962 | Persicke et al. | |
| 3,047,888 A | 8/1962 | Shecter et al. | |
| 3,061,460 A | 10/1962 | Schickedanz | |
| 3,114,722 A | 12/1963 | Einhorn et al. | |
| 3,188,665 A | 6/1965 | Snyder | |
| 3,283,357 A | 11/1966 | Decker et al. | |
| 3,287,748 A | 11/1966 | Trogdon et al. | |
| 3,483,069 A | 12/1969 | Cairns et al. | |
| 3,531,552 A | 9/1970 | Getz et al. | |
| 3,551,924 A | 1/1971 | Frye, Sr. | |
| 3,591,444 A | 7/1971 | Hoppe | |
| 3,607,596 A | 9/1971 | Fairbanks | |
| 3,607,797 A | 9/1971 | Rubens et al. | |
| 3,627,622 A | 12/1971 | Vega | |
| 3,691,569 A | 9/1972 | Ikada | |
| 3,728,206 A | 4/1973 | Buese | |
| 3,813,462 A | 5/1974 | Roberts | |
| 3,846,857 A | 11/1974 | Weinstock | |
| 3,878,133 A | 4/1975 | Rubens | |
| 3,922,429 A | 11/1975 | Welch et al. | |
| 3,989,781 A | 11/1976 | Chant | |
| 4,051,210 A | 9/1977 | Wallenberger | |
| 4,073,020 A | 2/1978 | Stalter et al. | |
| 4,146,562 A | 3/1979 | Fukushima et al. | |
| 4,159,355 A | 6/1979 | Kaufman | |
| 4,169,184 A | 9/1979 | Pufahl | |
| 4,213,214 A | 7/1980 | Gilhooly | |
| 4,224,374 A | 9/1980 | Priest | |
| 4,230,521 A | 10/1980 | Cobb et al. | |
| 4,260,660 A | 4/1981 | McCarter | |
| 4,276,107 A | 6/1981 | Pufahl | |
| 4,279,953 A | 7/1981 | Barden et al. | |
| 4,281,197 A | 7/1981 | Oblinger | |
| 4,350,734 A | 9/1982 | Hammond | |
| 4,393,116 A | 7/1983 | Taylor | |
| 4,438,221 A | 3/1984 | Fracalossi et al. | |
| 4,525,386 A | 6/1985 | Weisman | |
| 4,537,825 A | 8/1985 | Yardley | |
| 4,560,613 A | 12/1985 | Ollivier et al. | |
| 4,569,861 A | 2/1986 | Smith et al. | |
| 4,631,768 A | 12/1986 | Ferrall | |
| 4,683,246 A | 7/1987 | Davis et al. | |
| 4,780,167 A | 10/1988 | Hill | |
| 4,828,325 A | 5/1989 | Brooks | |
| 4,837,881 A | 6/1989 | Kondo et al. | |
| 4,957,798 A | 9/1990 | Bogdany | |
| 4,966,919 A | 10/1990 | Williams, Jr. et al. | |
| 4,997,804 A | 3/1991 | Pekala | |
| 4,999,868 A | 3/1991 | Kraft | |
| 5,031,261 A | 7/1991 | Fenner, Sr. | |
| 5,037,859 A | 8/1991 | Williams, Jr. et al. | |
| 5,047,436 A | 9/1991 | Hill et al. | |
| 5,086,084 A | 2/1992 | Michaelson | |
| 5,087,514 A | 2/1992 | Graefe | |
| 5,098,778 A | 3/1992 | Minnick | |
| 5,114,773 A | 5/1992 | Bogdany | |
| 5,132,549 A | 7/1992 | Allan et al. | |
| 5,136,740 A | 8/1992 | Kraft | |
| 5,206,082 A | 4/1993 | Malone | |
| 5,248,550 A | 9/1993 | Turpin et al. | |
| 5,272,001 A | 12/1993 | Weisman | |
| 5,366,999 A | 11/1994 | Giez et al. | |
| 5,389,317 A | 2/1995 | Grimmer | |
| 5,395,860 A | 3/1995 | Leung et al. | |
| 5,415,822 A | 5/1995 | Cook | |
| 5,418,257 A | 5/1995 | Weisman | |
| 5,430,901 A | 7/1995 | Farley | |
| 5,451,451 A | 9/1995 | Minnick | |
| 5,492,662 A | 2/1996 | Kargol et al. | |
| 5,494,627 A | 2/1996 | Kargol et al. | |
| 5,544,908 A | 8/1996 | Fezio | |
| 5,686,167 A | 11/1997 | Rudy | |
| 5,701,623 A | 12/1997 | May | |
| 5,721,035 A | 2/1998 | Dunn | |
| 5,740,574 A | 4/1998 | Piraino | |
| 5,755,901 A | 5/1998 | Ormachea | |
| 5,801,211 A | 9/1998 | Tornero et al. | |
| 5,806,796 A | 9/1998 | Healey | |
| 5,869,172 A | 2/1999 | Caldwell | |
| 5,876,652 A | 3/1999 | Rorabaugh et al. | |
| 5,919,413 A | 7/1999 | Avila | |
| 5,944,389 A | 8/1999 | Zenba et al. | |
| 5,945,461 A | 8/1999 | Gosiewski et al. | |
| 5,960,497 A | 10/1999 | Castellino et al. | |
| 5,977,271 A | 11/1999 | McKay et al. | |
| 6,026,527 A * | 2/2000 | Pearce | 5/654 |
| 6,108,835 A * | 8/2000 | Hwang | 5/420 |
| 6,129,978 A | 10/2000 | Caldwell | |
| 6,132,323 A | 10/2000 | Smith et al. | |
| 6,139,956 A | 10/2000 | Endoh et al. | |
| 6,212,720 B1 | 4/2001 | Antinori et al. | |
| 6,258,310 B1 | 7/2001 | Sardanopoli et al. | |
| 6,262,137 B1 | 7/2001 | Kozma et al. | |
| 6,306,235 B1 | 10/2001 | Henderson | |
| 6,317,912 B1 | 11/2001 | Graebe et al. | |
| 6,323,251 B1 | 11/2001 | Perez et al. | |
| 6,406,780 B1 | 6/2002 | Sutherland | |
| 6,537,405 B1 | 3/2003 | Henderson et al. | |
| 6,555,214 B1 | 4/2003 | Yates | |
| 6,574,814 B2 | 6/2003 | Collard et al. | |
| 6,596,389 B1 | 7/2003 | Hallett et al. | |
| 6,658,683 B2 | 12/2003 | Parvin | |
| 6,687,935 B2 | 2/2004 | Reeder et al. | |
| 6,701,551 B1 | 3/2004 | Antinori | |
| 6,740,381 B2 | 5/2004 | Day et al. | |
| 6,743,830 B2 | 6/2004 | Soane et al. | |
| 6,807,698 B2 | 10/2004 | Torbet et al. | |
| 6,920,287 B1 | 7/2005 | Hinds et al. | |
| 6,949,588 B2 | 9/2005 | Park | |
| 6,967,833 B2 | 11/2005 | Boykin et al. | |
| 7,045,206 B1 | 5/2006 | Granata et al. | |
| 7,059,001 B2 | 6/2006 | Woolfson | |
| 7,076,822 B2 | 7/2006 | Pearce | |
| 7,082,635 B2 | 8/2006 | Barman et al. | |
| 7,086,108 B1 | 8/2006 | Litvak | |
| 7,166,646 B2 | 1/2007 | Loh et al. | |
| 7,173,070 B2 | 2/2007 | Koffler | |
| 7,191,483 B2 | 3/2007 | Hochschild | |
| 7,281,917 B2 | 10/2007 | Hannen | |
| 7,285,316 B2 | 10/2007 | Meyer-Ahrens et al. | |
| 7,334,280 B1 | 2/2008 | Swartzburg | |
| 7,386,903 B2 | 6/2008 | Hochschild | |
| 7,393,577 B2 | 7/2008 | Day et al. | |
| 7,452,585 B1 | 11/2008 | Wong et al. | |
| 7,491,753 B2 | 2/2009 | Krishnan | |
| 7,496,981 B2 | 3/2009 | Alonso Cucurull | |
| 7,607,911 B2 | 10/2009 | Sperry et al. | |
| 7,793,372 B2 | 9/2010 | Lean et al. | |
| 7,794,827 B2 | 9/2010 | Palmer et al. | |
| 7,845,035 B2 | 12/2010 | Letton et al. | |
| 8,034,445 B2 | 10/2011 | Landvik et al. | |
| 8,127,383 B2 | 3/2012 | Gladney et al. | |
| 8,307,482 B2 | 11/2012 | Gladney et al. | |
| 2001/0029632 A1 | 10/2001 | Parvin | |
| 2001/0044972 A1 | 11/2001 | Kutschi | |
| 2002/0054996 A1 | 5/2002 | Rheenen | |
| 2002/0162173 A1 | 11/2002 | Formenti | |
| 2002/0185905 A1 | 12/2002 | Cassinelli | |
| 2003/0177584 A1 | 9/2003 | Boyd | |
| 2003/0194546 A1 | 10/2003 | McCabe | |
| 2003/0207634 A1 | 11/2003 | Holeschovsky | |
| 2004/0010855 A1 | 1/2004 | Piraino | |
| 2004/0126558 A1 | 7/2004 | Williams et al. | |
| 2004/0133987 A1 | 7/2004 | Reeder et al. | |
| 2004/0137212 A1 | 7/2004 | Ochoa et al. | |
| 2004/0172766 A1 | 9/2004 | Formenti | |
| 2005/0115003 A1 | 6/2005 | Torbet et al. | |
| 2005/0188467 A1 | 9/2005 | Woolfson | |
| 2005/0192368 A1 | 9/2005 | Miller et al. | |
| 2006/0068169 A1 | 3/2006 | Hanada et al. | |
| 2006/0123553 A1 | 6/2006 | Jansen | |
| 2006/0195988 A1 | 9/2006 | Gladney | |
| 2006/0272098 A1 | 12/2006 | Hochschild | |
| 2006/0290039 A1 | 12/2006 | Cao et al. | |
| 2007/0022540 A1 | 2/2007 | Hochschild | |
| 2007/0044906 A1 | 3/2007 | Park | |

| | | |
|---|---|---|
| 2007/0221890 A1 | 9/2007 | Gan |
| 2007/0289069 A1 | 12/2007 | Wells |
| 2008/0014387 A1 | 1/2008 | Murphy et al. |
| 2008/0299379 A1 | 12/2008 | Maurer et al. |
| 2008/0313815 A1 | 12/2008 | Guesquiere |
| 2009/0011203 A1 | 1/2009 | Mock et al. |
| 2009/0047495 A1 | 2/2009 | Hubbs |
| 2009/0139033 A1 | 6/2009 | Gladney |
| 2009/0142551 A1 | 6/2009 | Fox et al. |
| 2009/0291290 A1 | 11/2009 | Zhang et al. |
| 2010/0018347 A1 | 1/2010 | Holden et al. |
| 2010/0021690 A1 | 1/2010 | McCarthy |
| 2010/0047550 A1 | 2/2010 | Prissok et al. |
| 2010/0143652 A1 | 6/2010 | Stockton et al. |
| 2010/0218319 A1 | 9/2010 | Moule et al. |
| 2010/0221521 A1 | 9/2010 | Wagner et al. |
| 2010/0223732 A1 | 9/2010 | Allman et al. |
| 2010/0223734 A1 | 9/2010 | Oh |
| 2010/0237082 A1 | 9/2010 | Fernandez |
| 2010/0304104 A1 | 12/2010 | Nagasaki et al. |
| 2010/0319137 A1* | 12/2010 | Witherell et al. .................. 5/717 |
| 2010/0325806 A1 | 12/2010 | Letton et al. |
| 2011/0049327 A1 | 3/2011 | Young et al. |
| 2011/0179579 A1* | 7/2011 | Henderson et al. ............... 5/717 |
| 2011/0197363 A1* | 8/2011 | Kokenes et al. .................. 5/652 |
| 2012/0180225 A1 | 7/2012 | Gladney et al. |
| 2012/0233784 A1 | 9/2012 | Wood |
| 2012/0272457 A1* | 11/2012 | Allman et al. ..................... 5/716 |
| 2012/0284928 A1 | 11/2012 | Henderson et al. |

FOREIGN PATENT DOCUMENTS

| | | |
|---|---|---|
| EP | 0209453 B2 | 9/1993 |
| EP | 0996654 B1 | 2/2004 |
| EP | 1865812 A1 | 12/2007 |
| EP | 1914274 A1 | 4/2008 |
| EP | 2095745 A1 | 9/2009 |
| GB | 1423541 A | 2/1976 |
| WO | 2010075231 A1 | 1/2010 |
| WO | 2011150080 A1 | 12/2011 |
| WO | 2012033985 A1 | 3/2012 |
| WO | 2012145320 A1 | 10/2012 |
| WO | 2012155131 A1 | 11/2012 |
| WO | 2012155132 A1 | 11/2012 |

OTHER PUBLICATIONS

Kelmpner, Daniel et al., "3.3 Open- and Closed-Cell Foamed Plastics," Polymeric Foam and Foam Technology, Second Edition, Hanser Gardner Publications, Inc., Cincinnati, OH, Apr. 2004, pp. 22, 39 and 59.

International Search Report and Written Opinion for PCT/US2011/024759 mailed Apr. 7, 2011, 12 pages.

International Preliminary Report on Patentability for PCT/US2011/024759 mailed Aug. 14, 2012, 8 pages.

* cited by examiner

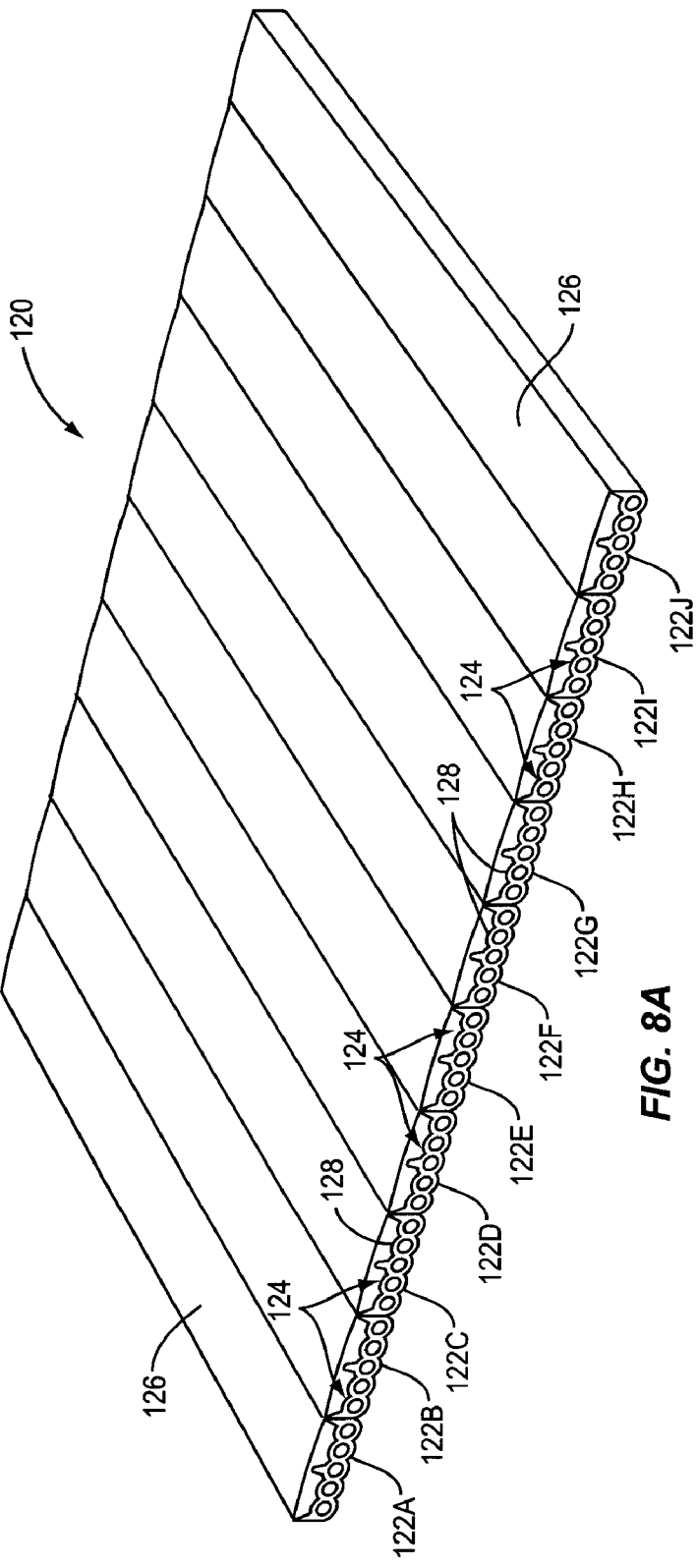
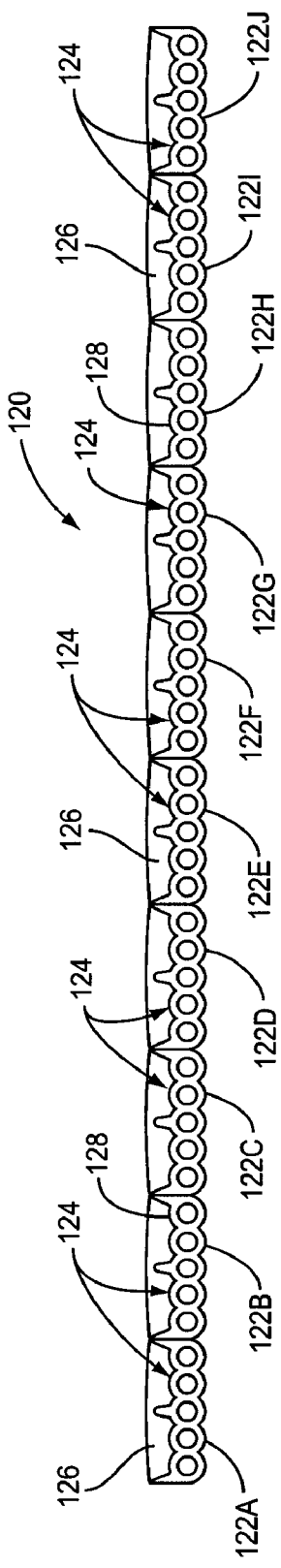

UNITARY COMPOSITE/HYBRID CUSHIONING STRUCTURE(S) AND PROFILE(S) COMPRISED OF A THERMOPLASTIC FOAM(S) AND A THERMOSET MATERIAL(S)

RELATED APPLICATION

This application claims priority to U.S. Provisional Patent Application No. 61/157,970, filed on Mar. 6, 2009, entitled "COMPOSITE/HYBRID STRUCTURES AND FORMULATIONS OF THERMOSET ELASTOMER FOAMS AND THERMOPLASTIC ENGINEERED GEOMETRIC FOAM PROFILE," which is hereby incorporated herein by reference in its entirety.

BACKGROUND

1. Field of the Disclosure

The technology of this disclosure relates generally to cushioning structures. The cushioning structures can be used for any cushion applications desired, including but not limited to mattresses, seats, foot and back support, and upholstery, as examples.

2. Technical Background

Cushioning structures are employed in support applications. Cushioning structures can be employed in bedding and seating applications, as examples, to provide cushioning and support. Cushioning structures may also be employed in devices for safety applications, such as helmets and automobiles for example.

The design of a cushioning structure may be required to have both high and low stiffness. For example, it may be desirable to provide a cushioning material or device in which a body or object will easily sink into the cushion a given distance before the applied weight is supported. As another example, it may be desired to provide surfaces having low stiffness initially during application of weight, while the underlying structure needs to have high stiffness for support. These surfaces may be provided in safety applications, such as helmets and automobile dashboards as examples. In this regard, a cushioning structure may be designed that provides an initial large deflection at a low applied force with nonlinearly increasing stiffness at increasing deflection.

To provide a cushioning structure with high and low stiffness features, cushioning structures can be composed of layers of varying thicknesses and properties. Each of these components has different physical properties, and as a result of these properties and variations in thicknesses and location of the components, the cushioning structure has a certain complex response to applied pressure. For example, cushioning structures generally include components made from various types of foam, cloth, fibers and/or steel to provide a general response to pressure that is perceived as comfortable to the individual seeking a place to lie, sit, or rest either the body as a whole or portions thereof. General foam plastic materials can also be used as materials of choice for cushion applications. Foam plastic materials provide a level of cushionability in and of themselves, unlike a steel spring or the like structure. Generally accepted foams fall within two categories: thermosets and thermoplastics.

Thermoset materials exhibit the ability to recover after repeated deformations and provide a generally excepted sleep surface. Thermoplastic materials including thermoplastic foams, and specifically closed cell thermoplastic foams, on the other hand, while not having the long time frame repeatable deformation capabilities of the thermoset foams, typically provide greater firmness and support. Further, thermoplastic materials are suitable to lower density, less weight, and therefore less costly production while maintaining a more structurally stable aspect to their construction.

One example of a cushioning structure employing layers of varying thicknesses and properties for discussion purposes is provided in a mattress 10 of FIG. 1. As illustrated therein, a mattress innerspring 12 (also called "innerspring 12") is provided. The innerspring 12 is comprised of a plurality of traditional coils 14 arranged in an interconnected matrix to form a flexible core structure and support surfaces of the mattress 10. The coils 14 are also connected to each other through interconnection helical wires 16. Upper and lower border wires 18, 20 are attached to upper and lower end turns of the coils 14 at the perimeter of the array to create a frame for the innerspring 12. The upper and lower border wires 18, 20 also create firmness for edge support on the perimeter of the innerspring 12 where an individual may disproportionally place force on the innerspring 12, such as during mounting onto and dismounting from the mattress 10. The innerspring 12 is disposed on top of a box spring 22 to provide base support.

The coils 14 located proximate to an edge 23 of the innerspring 12 are subjected to concentrated loads as opposed to coils 14 located in an interior 24. To provide further perimeter structure and edge support for the innerspring 12, support members 25 may be disposed around the coils 14 proximate to the edge 23 of the innerspring 12 between the box spring 22 and the upper and lower border wires 18, 20. The support members 25 may be extruded from polymer-foam as an example.

To provide a cushioning structure with high and low stiffness features, various layers of sleeping surface or padding material 26 can be disposed on top of the innerspring 12. The padding material 26 provides a cushioning structure for a load placed on the mattress 10. In this regard, the padding material 26 may be made from various types of foam, cloth, fibers and/or steel to provide a generally repeatable comfortable feel to the individual seeking a place to either lie, sit, or rest, either the body as a whole or portions thereof. To provide the cushioning structure with high and low stiffness features, the padding material 26 may consist of multiple layers of materials that may exhibit different physical properties.

For example, foam plastic materials can be used as materials of choice for the padding material 26. Foam plastic materials provide a level of cushionability in and of themselves, unlike a steel spring, or the like structure. For example, an uppermost layer 28 may be a soft layer comprised of a thermoset material. Thus, in the example of FIG. 1, the uppermost layer 28 being provided as a thermoset material allows a load to sink into the mattress 10 while exhibiting the ability to recover after repeated deformations. One or more intermediate layers 30 underneath the uppermost layer 28 may be provided to have greater stiffness than the uppermost layer 28 to provide support and pressure spreading that limits the depth to which a load sinks. For example, the intermediate layers 30 may also include a thermoset material, such as latex as an example. A bottom layer 32 may be provided below the intermediate layers 30 and uppermost layer 28. The uppermost layer 28, the intermediate layers 30, and the bottom layer 32 serve to provide a combination of desired cushioning characteristics. An upholstery 34 is placed around the entire padding material 26, innerspring 12, and box spring 22 to provide a fully assembled mattress 10.

The material selection and thicknesses of the uppermost layer 28, the intermediate layers 30, and the bottom layer 32 of the mattress 10 can be designed to control and provide the desired cushioning characteristics. However, it may be desired to also provide support characteristics in the padding material 26. However, the disposition of layers in the padding material 26 does not easily allow for providing variations in both cushioning and support characteristics. For example, a thermoplastic foam could be included in the padding material 26 to provide greater firmness. However, compression will occur in the thermoplastic foam over time. Regardless, further complications that can occur as a result of including an additional thermoplastic material include the separate manufacturing and stocking for assembly of the mattress 10, thus adding inventory and storage costs. Further, an increase in the number of structures provided in the padding material 26 during assembly of the mattress 10 increases labor costs.

SUMMARY OF THE DETAILED DESCRIPTION

Embodiments disclosed in the detailed description include a unitary or monolithic composite (or hybrid) cushioning structure(s) and profile(s) comprised of a cellular thermoplastic foam and a thermoset material. The thermoset material may also be provided as cellular foam as well. In one embodiment disclosed herein, the unitary composite or hybrid cushioning structure is formed from a cellular thermoplastic foam and a thermoset material. The cellular thermoplastic foam provides support characteristics to the unitary composite cushioning structure. The thermoset material provides a resilient structure with cushioning characteristics to the cushioning structure. A stratum is disposed between at least a portion of the cellular thermoplastic foam and at least a portion of the thermoset material to secure the at least a portion of the thermoset material to the at least a portion of the cellular thermoplastic foam to provide a unitary composite cushioning structure. The stratum includes a cohesive or adhesive bond, such as a mechanical or chemical bond, as examples. The stratum may provide an intimate engagement between at least a portion of the thermoset material and at least a portion of the cellular thermoplastic foam to provide the unitary composite cushioning structure. The cellular thermoplastic foam may also be provided as a custom engineered profile to provide a custom engineered profile for engagement of the thermoset material and thus the unitary composite cushioning structure.

A unitary structure within the context of this disclosure is a structure having the character of a unit, undivided and integrated. The term composite or hybrid within the context of this disclosure is a complex structure having two or more distinct structural properties provided by two or more distinct material structures that are cohesively or adhesively bonded together to provide the combined functional properties of the two or more distinct structural properties which are not present in combination in any individual material structure.

There are several non-limiting and non-required advantages of the unitary composite cushioning structures disclosed herein. For example, the unitary composite cushioning structure is provided as a unitary structure as opposed to providing disparate, non-bonded structures each comprised exclusively of thermoplastic or thermoset materials. This allows the tactile cushioning and resiliency benefits of thermoset materials and the supportive and structural capabilities of the cellular thermoplastic foams to create a cushioning structure combining the desired characteristics and features of both material types into one unitary composite cushioning structure.

Further, the thermoset material provided as part of the unitary composite cushioning structure allows the cellular thermoplastic foam to exhibit excellent offset of compression set while retaining support characteristics to provide stability to the unitary composite cushioning structure. Thermoset materials can be selected that exhibit the desired offset of compression set. Without the employment of the thermoset material, the thermoplastic profile may not be able to provide the desired support characteristics without the undesired effects of compression set, also known as "sagging." This engagement of a thermoset material with a cellular thermoplastic foam utilizes the thermoset material's ability to recover over long periods of repeated deformations. Another advantage can be cost savings. The cellular thermoplastic foam may be less expensive than the thermoset material while still providing a suitable composite cushioning structure exhibiting desired stability and offset of compression set.

Non-limiting examples of thermoplastic materials that can be used to provide a cellular thermoplastic foam in the unitary composite cushioning structure include polypropylene, polypropylene copolymers, polystyrene, polyethylenes, ethylene vinyl acetates (EVAs), polyolefins, including metallocene catalyzed low density polyethylene, thermoplastic olefins (TPOs), thermoplastic polyester, thermoplastic vulcanizates (TPVs), polyvinyl chlorides (PVCs), chlorinated polyethylene, styrene block copolymers, ethylene methyl acrylates (EMAs), ethylene butyl acrylates (EBAs), and the like, and derivatives thereof. The density of the thermoplastic material may be provided to any density desired to provide the desired weight and support characteristics for the unitary composite cushioning structure. Further, a thermoplastic material can be selected that is inherently resistant to microbes and bacteria, making such desirable for use in the application of cushioning structures. These thermoplastic materials can also be made biodegradable and fire retardant through the use of additive master batches.

Non-limiting examples of thermoset materials include polyurethanes, natural and synthetic rubbers, such as latex, silicones, EPDM, isoprene, chloroprene, neoprene, melamine-formaldehyde, and polyester, and derivatives thereof. The density of the thermoset material may be provided to any density desired to provide the desired resiliency and cushioning characteristics to the unitary composite cushioning structure. The thermoset material and can be soft or firm depending on formulations and density selections. Further, if the thermoset material selected is a natural material, such as latex for example, it may be considered biodegradable. Further, bacteria, mildew, and mold cannot live in certain thermoset foams.

Numerous variations of the unitary composite cushioning structure and its thermoplastic and thermoset components are disclosed. For example, the cellular thermoplastic foam may be closed-cell foam, open-cell foam, or partially open or closed-cell foam. The cellular thermoplastic foam may be provided or engineered as a cellular foam profile with desired geometrical configurations to provide controlled deformation support characteristics. For example, one or more open or closed channels can be disposed in a cellular thermoplastic foam profile, wherein the thermoset material is disposed within the channels to provide the resiliency and cushioning characteristics of the thermoset material to the support characteristics of the cellular thermoplastic foam profile. Alternatively, a cellular thermoplastic profile may be encapsulated fully or partially by a thermoset material to provide the resiliency and cushioning characteristics of the thermoset material to the support characteristics of the cellular thermoplastic foam profile. These cellular thermoplastic foam profiles may be produced by any method or process desired including but not limited to direct continuous extrusion, extrusion injection molding, blow molding, casting, thermal forming, and the like.

The unitary composite cushioning structure may be used as a cushion structure for any application desired. Examples include, but are not limited to, cushions, pillows, mattress assemblies, seat assemblies, helmet assemblies, mats, grips, packagings, and bolsters. Specifically in regard to mattress assemblies, the unitary composite cushioning structure could be employed in any part or component of the mattress assembly, including but not limited to bases, edge supports, side supports, corner supports, support components, and padding materials, and as coil-like structures to replace or be used in combination with traditional metal coils to provide support. Further, the unitary composite cushioning structures could be provided in particular regions or zones of a support structure to provide different zones of cushioning characteristics. For example, the unitary composite cushioning structures could be deployed to areas where heavier loads are supported to provide increased support, such as lumbar, head, and/or foot support, as examples.

Additional features and advantages will be set forth in the detailed description which follows, and in part will be readily apparent to those skilled in the art from that description or recognized by practicing the invention as described herein, including the detailed description that follows, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIGS. 8A and 8B are perspective and side views, respectively, of an exemplary unitary composite cushioning structure comprised of an extruded thermoplastic foam profile incorporating chambers with a thermoset material disposed in the chambers and a stratum provided therebetween to provide zoned cushioning characteristics in a sleep or seat surface;

DETAILED DESCRIPTION

Figure 1:
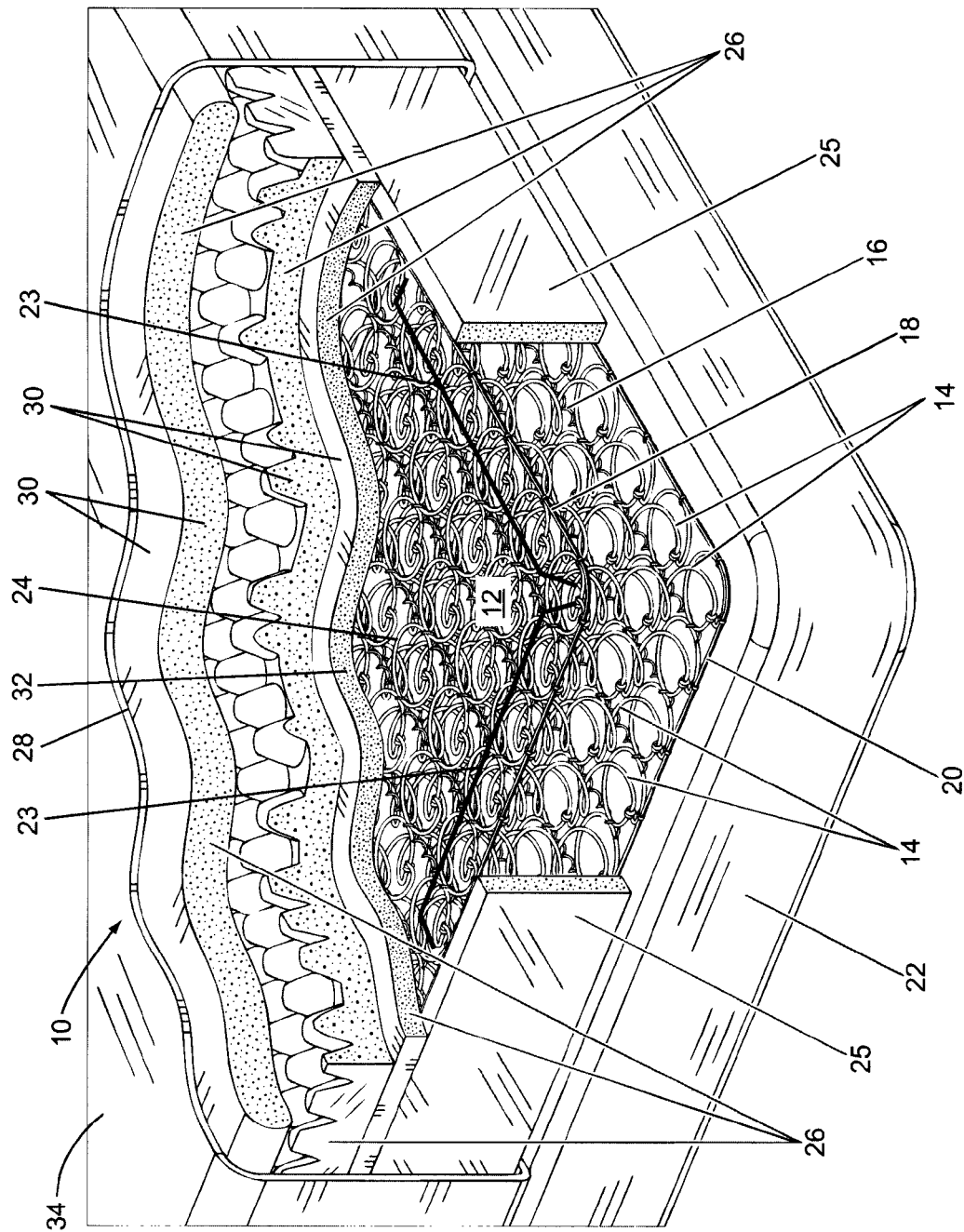
FIG. 1 is an exemplary prior art mattress employing an innerspring of wire coils.

Embodiments disclosed in the detailed description include a unitary or monolithic composite (or hybrid) cushioning structure(s) and profile(s) comprised of a cellular thermoplastic foam and a thermoset material. The thermoset material may also be provided as cellular foam as well. In one embodiment disclosed herein, the unitary composite or hybrid cushioning structure is formed from a cellular thermoplastic foam and a thermoset material. The cellular thermoplastic foam provides support characteristics to the unitary composite cushioning structure. The thermoset material provides a resilient structure with cushioning characteristics to the cushioning structure. A stratum is disposed between at least a portion of the cellular thermoplastic foam and at least a portion of the thermoset material to secure the at least a portion of the thermoset material to the at least a portion of the cellular thermoplastic foam to provide a unitary composite cushioning structure. The stratum includes a cohesive or adhesive bond, such as a mechanical or chemical bond, as examples. The stratum may provide an intimate engagement between at least a portion of the thermoset material and at least a portion of the cellular thermoplastic foam to provide the unitary composite cushioning structure. The cellular thermoplastic foam may also be provided as a custom engineered profile to provide a custom engineered profile for engagement of the thermoset material and thus the unitary composite cushioning structure.

A unitary structure within the context of this disclosure is a structure having the character of a unit, undivided and integrated. The term composite or hybrid within the context of this disclosure is a complex structure having two or more distinct structural properties provided by two or more distinct material structures that are cohesively or adhesively bonded together to provide the combined functional properties of the two or more distinct structural properties which are not present in combination in any individual material structure.

There are several non-limiting and non-required advantages of the unitary composite cushioning structures disclosed herein. For example, the unitary composite cushioning structure is provided as a unitary structure as opposed to providing disparate, non-bonded structures each comprised exclusively of thermoplastic or thermoset materials. This allows the tactile cushioning and resiliency benefits of thermoset materials and the supportive and structural capabilities of the cellular thermoplastic foams to create a cushioning structure combining the desired characteristics and features of both material types into one unitary composite cushioning structure.

Further, the thermoset material provided as part of the unitary composite cushioning structure allows the cellular thermoplastic foam to exhibit excellent offset of compression set while retaining support characteristics to provide stability to the unitary composite cushioning structure. Thermoset materials can be selected that exhibit the desired offset of compression set. Without the employment of the thermoset material, the thermoplastic profile may not be able to provide the desired support characteristics without the undesired effects of compression set, also known as "sagging." This engagement of a thermoset material with a cellular thermoplastic foam utilizes the thermoset material's ability to recover over long periods of repeated deformations. Another advantage can be cost savings. The cellular thermoplastic foam may be less expensive than the thermoset material while still providing a suitable composite cushioning structure exhibiting desired stability and offset of compression set.

Figure 2:
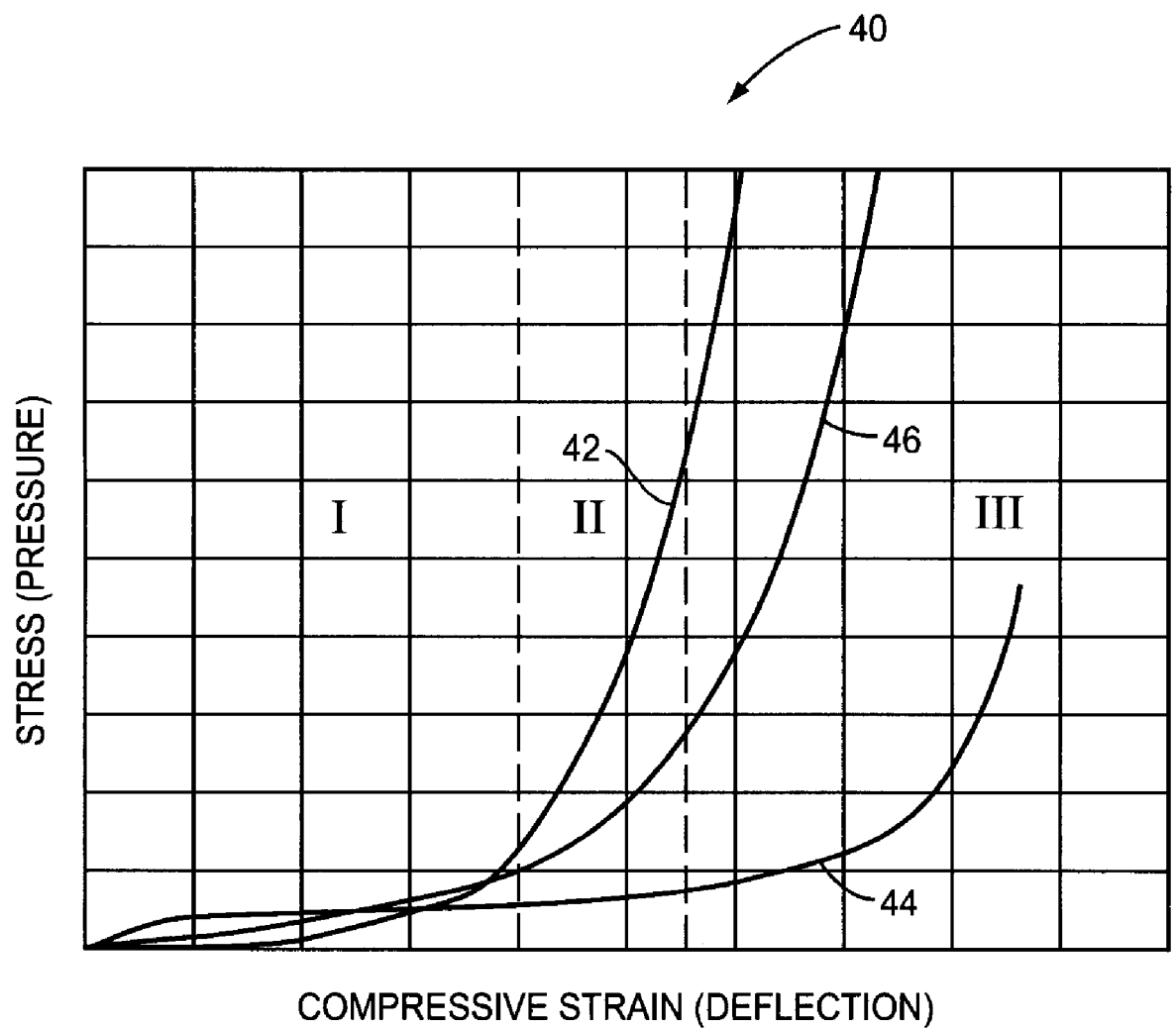
FIG. 2 is an exemplary chart of performance curves showing strain (i.e., deflection) under a given stress (i.e., pressure) for an exemplary thermoplastic material and thermoset material to illustrate their individual support characteristics and resiliency and cushioning characteristics, and the combined support characteristics of the thermoplastic material and the resilient structure with cushioning characteristics of the thermoset material when provided in a unitary composite cushioning structure.

Before discussing examples of unitary composite cushioning structures comprised of a cellular thermoplastic foam cohesively or adhesively bonded to a thermoset material at a stratum, a discussion of strains (i.e., deflections) over given stresses (i.e., pressures) for cushioning structures not included in a unitary composite cushioning structure, as provided herein, is first discussed. In this regard, FIG. 2 illustrates an exemplary chart 40 of performance curves 42, 44, 46 showing compressive strain or deflection for given stress or pressure levels for different types of cushioning materials. The performance curve 42 illustrates strain versus stress for an exemplary thermoplastic material used as a cushioning structure. As illustrated in Section I of the chart 40, when a low stress or pressure is placed on the thermoplastic material represented by the performance curve 42, the thermoplastic material exhibits a large strain as a percentage of stress. As stress increases, as shown in Section II of the chart 40, the thermoplastic material represented by the performance curve 42 continues to strain or deflect, but the strain is smaller as a percentage of stress than the strain in Section I of the chart 40. This represents the firmer structural properties of the thermoplastic material providing a greater role in response to increased stress, thus decreasing the softness feel. As the stress further increases, as shown in Section III of the chart 40, eventually, the thermoplastic material represented by the performance curve 42 will exhibit even greater firmness where strain or deflection is very small as a percentage of stress, or non-existent.

It may be determined that the thermoplastic material represented by the performance curve 42 in FIG. 2 does not exhibit enough softness or cushioning to a load as stress increases. In other words, the thermoplastic material may provide a greater firmness more quickly as a function of stress than desired, thereby not providing the desired softness or cushioning characteristic desired. Thus, a thermoset material may be selected for the cushioning structure in lieu of a thermoplastic material.

In this regard, the performance curve 44 in FIG. 2 illustrates strain versus stress for an exemplary thermoset material. As illustrated in Section I of the chart 40, when a low stress or pressure is placed on the thermoset material represented by the performance curve 44, the thermoplastic material exhibits a large strain as a percentage of stress similar to the thermoplastic material represented by performance curve 42. As stress increases, as provided in Section II of the chart 40, the thermoset material represented by the performance curve 44 continues to strain, but only slightly greater than the strain in Section I of the chart 40. Thus, the thermoset material is continuing to exhibit softness even as the stress of a load disposed thereon increases, as opposed to the thermoplastic material represented by the performance curve 42 in FIG. 2. However, the thermoset material represented by the performance curve 44 does not provide the support or firmness characteristics as provided by the thermoplastic material represented by the performance curve 42, thereby providing a spongy or lack of support feel to a load. As the stress further increases, as shown in Section III of the chart 40, eventually, the thermoset material represented by the performance curve 44 will reach a point where it will exhibit greater firmness where strain or deflection is very small as a percentage of stress, or non-existent.

Figure 3:
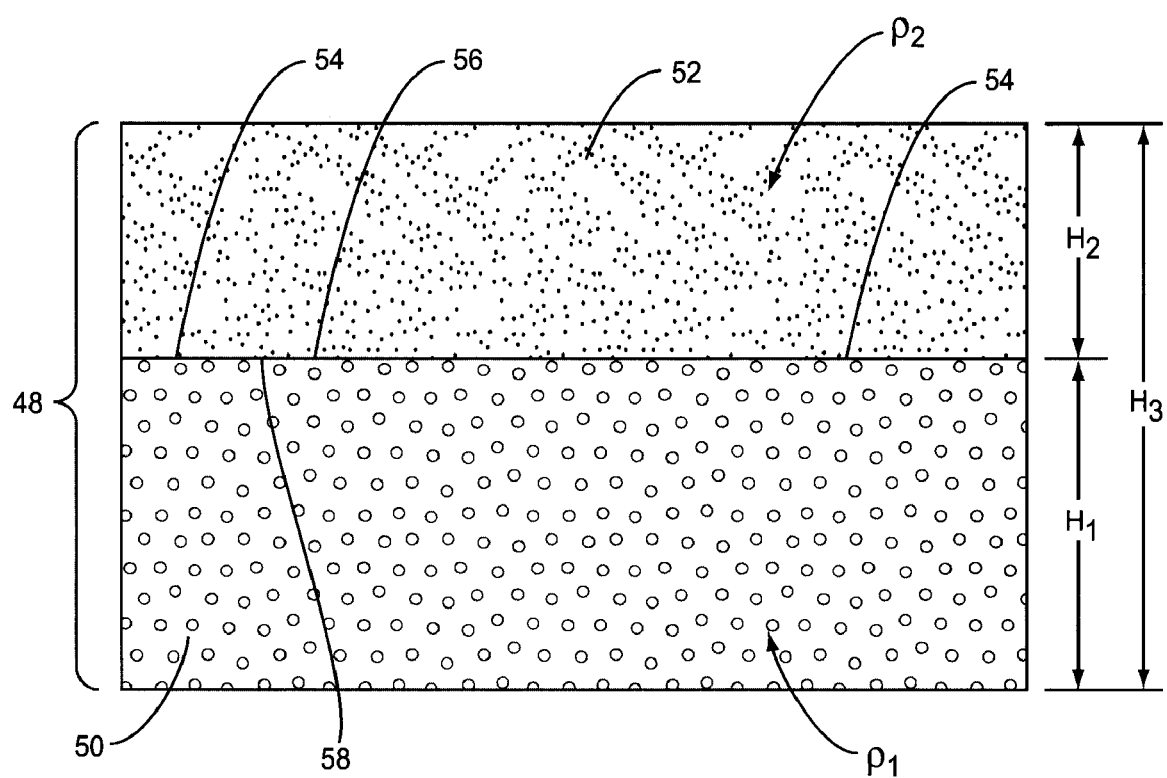
FIG. 3 is an exemplary unitary composite cushioning structure comprised of a thermoset material cohesively or adhesively bonded to a thermoplastic material with a stratum disposed therebetween.

Embodiments disclosed herein provide a cushioning structure that has a hybrid or combined strain versus stress characteristic of the performance curves 42 and 44. This is illustrated by the performance curve 46 in FIG. 2. The performance curve 46 in FIG. 2 illustrates a unitary composite or hybrid cushioning structure comprised of the thermoplastic material represented by the performance curve 42 and the thermoset material represented by the performance curve 44. FIG. 3 illustrates an example of a unitary composite cushioning structure that can provide the performance according to the performance curve 46 in FIG. 2.

As illustrated in FIG. 3, a profile of a unitary composite cushioning structure 48 is provided. The unitary composite cushioning structure 48 is a hybrid that includes both a thermoplastic material 50 and a thermoset material 52. A unitary structure within the context of this disclosure is a structure having the character of a unit, undivided and integrated. A composite or hybrid structure within the context of this disclosure is a complex structure having two or more distinct structural properties provided by two or more distinct material structures that are cohesively or adhesively bonded together to provide the combined functional properties of the two or more distinct structural properties which are not present in combination in any individual material structure.

The thermoplastic material 50 and the thermoset material 52 are cohesively or adhesively bonded together to provide a unitary or monolithic cushioning structure. In this regard, the unitary composite cushioning structure 48 exhibits combined characteristics of the support characteristics of the thermoplastic material 50 and the resiliency and cushioning characteristics of the thermoset material 52. The thermoplastic material 50 is provided to provide support characteristics desired for the unitary composite cushioning structure 48. The thermoplastic material 50 could be selected to provide a high degree of stiffness to provide structural support for the unitary composite cushioning structure 48. The thermoset material 52 can provide resiliency and softer cushioning characteristics to the unitary composite cushioning structure 48. A stratum 54 is disposed between at least a portion of the thermoplastic material 50 and at least a portion of the thermoset material 52 that includes a cohesive or adhesive bond between at least a portion of the thermoset material 52 to the at least a portion of the thermoplastic material 50 to provide the unitary composite cushioning structure 48.

Non-limiting examples of thermoplastic materials that can be used to provide the thermoplastic material 50 in the unitary composite cushioning structure 48 include polypropylene, polypropylene copolymers, polystyrene, polyethylenes, ethylene vinyl acetates (EVAs), polyolefins, including metallocene catalyzed low density polyethylene, thermoplastic olefins (TPOs), thermoplastic polyester, thermoplastic vulcanizates (TPVs), polyvinyl chlorides (PVCs), chlorinated polyethylene, styrene block copolymers, ethylene methyl acrylates (EMAs), ethylene butyl acrylates (EBAs), and the like, and derivatives thereof. The density of the thermoplastic material 50 may be provided to any density desired to provide the desired weight and support characteristics for the unitary composite cushioning structure 48. Further, the thermoplastic material 50 may be selected to also be inherently resistant to microbes and bacteria, making the thermoplastic material 50 desirable for use in cushioning structures and related applications. The thermoplastic material 50 can also be made biodegradable and fire retardant through the use of additive master batches.

Non-limiting examples of thermoset materials that can be used to provide thermoset material 52 in the unitary composite cushioning structure 48 include polyurethanes, natural and synthetic rubbers, such as latex, silicones, ethylene propylene diene Monomer (M-class) (EPDM) rubber, isoprene, chloroprene, neoprene, melamine-formaldehyde, and polyester, and derivatives thereof. The density of the thermoset material 52 may be provided to any density desired to provide the desired resiliency and cushioning characteristics to the unitary composite cushioning structure 48, and can be soft or firm depending on formulations and density. The thermoset material 52 could also be foamed. Further, if the thermoset material 52 selected is a natural material, such as latex for example, it may be considered biodegradable. Further, bacteria, mildew, and mold cannot live in certain thermoset foams. Also note that although the unitary composite cushioning structure 48 illustrated in FIG. 3 is comprised of at least two materials, the thermoplastic material 50 and the thermoset material 52, more than two different types of thermoplastic and/or thermoset materials may be provided in the unitary composite cushioning structure 48.

Taking the example of latex as the thermoset material 52 that may be used in providing the unitary composite cushioning structure 48, latex is a naturally derived biodegradable product that comes from the rubber tree. Latex is hypo-allergenic, and breathes to retain heat in the winter and not absorb heat in the summer. Bacteria, mildew, and mold cannot live in latex foam. Tests have shown that latex foam can be three times more resistant to dust mites and bacteria than ordinary cushioning structures, and thus may be desirable, especially as it would pertain to being natural and biodegradable. There are also synthetic versions of latex that do not fit into the natural category, but could also be used either solely or in combination with a natural product.

In the example of the unitary composite cushioning structure 48 of FIG. 3, the thermoplastic material 50 is provided. A bottom surface 56 of the thermoset material 52 disposed on a top surface 58 of the thermoplastic material 50. The stratum 54 is formed where the bottom surface 56 of the thermoset material 52 contacts or rests on and is cohesively or adhesively bonded to the top surface 58 of the thermoplastic material 50. The thermoplastic material 50 may be provided in a solid phase, such as a cellular foam for example. The thermoset material 52 may be provided initially in the unitary composite cushioning structure 48 as a non-solid phase, such as in a liquid form. The thermoplastic material 50 and the thermoset material 52 are not mixed together. The thermoset material 52 will undergo a transition into a solid form, thereby forming a cohesive or adhesive union with the thermoset material 52 at the stratum 54, as illustrated in FIG. 3. Thus, the thermoplastic material 50 and the thermoset material 52 cohesively or adhesively bond together to form a unitary structure that provides combined properties of the support characteristics of the thermoplastic material 50 and the resiliency and cushioning characteristics of the thermoset material 52 that may not otherwise be possible by providing the thermoplastic material 50 and thermoset material 52 in separate, non-unified structures or layers. Advantages in this example include, but are not limited to, compression recovery, reduced weight, fewer layers of cushioning material, less labor in assembly, smaller form factor of the cushioning structure, less inventory, and/or antimicrobial features.

A curing process can be performed on the unitary composite cushioning structure 48 to set and cohesively or adhesively bond the thermoset material 52 to the thermoplastic material 50. The thermoset material 52 is mechanically bonded to the thermoplastic material 50 in this embodiment, but chemical bonding can be provided. Further, a chemical bonding agent can be mixed in with the thermoplastic material 50, such as before or during a foaming process for example, to produce the thermoplastic material 50, or when the thermoset material 52 is disposed in contact with the thermoplastic material 50 to provide a chemical bond with the thermoset material 52 during the curing process.

It may be desired to control the combined cushioning properties of the unitary composite cushioning structure 48 in FIG. 3. For example, it may be desired to control the degree of support or firmness provided by the thermoplastic material 50 as compared to the resiliency and cushioning characteristics of the thermoset material 52. In this regard, as an example, the thermoplastic material 50 is provided as a solid block of height $H_1$, as illustrated in FIG. 3. The thermoset material 52 is provided of height $H_2$, as also illustrated in FIG. 3. The relative volume of the thermoplastic material 50 as compared to the thermoset material 52 can control the combined cushioning properties, namely the combined support characteristics and the resiliency and cushioning characteristics, in response to a load. These combined characteristics can also be represented as a unitary strain or deflection for a given stress or pressure, as previously discussed.

Further, by being able to control the volume of the thermoplastic material 50 and the thermoset material 52, the same combined cushioning properties may be able to be provided in a smaller overall volume or area. For example, with reference to FIG. 3, the individual heights $H_1$ and $H_2$ may be less important in providing the combined cushioning characteristics of the unitary composite cushioning structure 48 than the ratio of the respective heights $H_1$ and $H_2$. Thus, the overall height $H_3$ (i.e., $H_1+H_2$) of the unitary composite cushioning structure 48 may be able to be reduced over providing distinct, non-bonded layers of cushioning structures.

Further, a relative density $\rho_1$ of the thermoplastic material 50 as compared to a density $\rho_2$ of the thermoset material 52 can control the responsiveness of the combined cushioning properties. For example, the density $\rho_1$ of the thermoplastic material 50 could be in the range between one-half pound (lb.) per cubic foot ($ft^3$) to 30 lbs./$ft^3$ (i.e., 8 kilograms (kg) per cubic meter ($m^3$) to 480 kg/$m^3$), as an example. The density $\rho_2$ of the thermoset material 52 could be in the range between one pound (lb.) per cubic foot ($ft^3$) to 15 lbs./$ft^3$ (i.e., 16 kilograms (kg) per cubic meter ($m^3$) to 240 kg/$m^3$), as an example. The variability of densities $\rho_1$ of the thermoplastic material 50 relative to $\rho_2$ of the thermoset material 52 can be selected to customize the resultant properties of the unitary composite cushioning structure 48 that may not otherwise be possible by providing the thermoset material 52 as a distinct, non-unitary component or structure from the thermoplastic material 50.

Further, the thermoplastic material 50 and thermoset material 52 may each have different indentation load deflections (ILDs). ILD is a measurement of foam firmness. Firmness is independent of foam density, although it is often thought that higher density foams are firmer. It is possible to have high density foams that are soft—or low density foams that are firm, depending on the ILD specification. ILD specification relates to comfort. It is a measurement of the surface feel of the foam. ILD may be measured by indenting (compressing) a foam sample twenty-five (25) percent of its original height. The amount of force required to indent the foam is its twenty-five (25) percent ILD measurement. The more force required, the firmer the foam. Flexible foam ILD measurements can range from ten (10) pounds (supersoft) to about eighty (80) pounds (very firm).

The thermoplastic material 50 of the unitary composite cushioning structure 48 can be provided as a cellular thermoplastic foam profile, if desired. By providing the thermoplastic material 50 of the unitary composite cushioning structure 48 as a cellular foam profile, control of the shape and geometry of the unitary composite cushioning structure 48 can be provided, as desired. For example, the extrusion foaming art, with the ability to continuously produce and utilize specific die configurations having the ability to geometrically design and profile elements for cushioning support is a method to obtain the desired thermoplastic engineered geometry foam profiles to be used with a thermoset material or materials to provide the unitary composite cushioning structure 48. In this manner, the unitary composite cushioning structure 48 can be provided for different applications based on the desired geometric requirements of the cushioning structure. Machine direction (MD) attributes as well as transverse direction (TD) attributes may be employed to extrude a thermoplastic foam profile. However, other methods of providing thermoplastic foam profiles may also be employed, including molding, casting, thermal forming, and other processes known to those skilled in the art.

Thermoset foam profiles can be obtained in emulsified form and are frothed to introduce air into the emulsion to reduce density, and are then cured (vulcanized) to remove additional waters and volatiles as well as to set the material to its final configuration. Thermoset materials can also be further cost reduced through the addition of fillers such as ground foam reclaim materials, nano clays, carbon nano tubes, calcium carbonate, flyash and the like, but also core dust as this material can provide for increased stability to reduce the overall density and weight of the thermoset material. Further, thermoplastic foams, when used in combination with a thermoset foam, will consume space within a cushion structure, thereby displacing the heavier-weight, more expensive thermoset materials, such as latex rubber foam, as an example.

Figure 4:
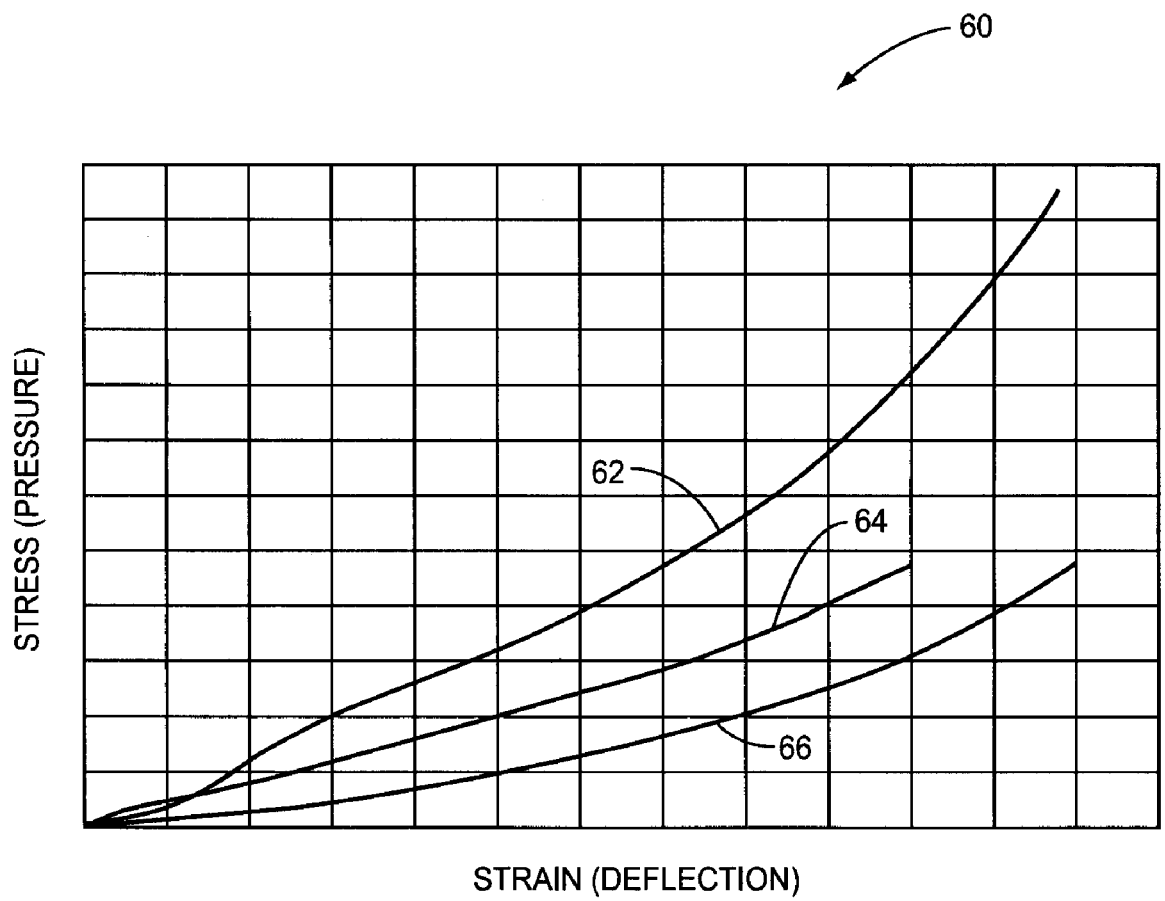
FIG. 4 is an exemplary chart of performance curves showing strain (i.e., deflection) under a given stress (i.e., pressure) for different types of thermoplastic foam structures to show the ability to engineer a cellular thermoplastic foam profile to provide for manufacturing a unitary composite cushioning structure.

In this regard, FIG. 4 provides an exemplary chart 60 of performance curves showing strain (deflection) under a given stress (pressure) for different types of thermoplastic foam cushioning structures to show the ability to engineer a cellular thermoplastic foam profile to provide the desired firmness and support characteristics in the unitary composite cushioning structure 48. A performance curve 62 illustrates the result of testing of strain for a given stress of an exemplary solid block of low density polyethylene foam before being engineered into a particular profile. Performance curves 64, 66 represent the result of testing of strain for a given stress of two exemplary polyethylene foam extrusion profiles formed from the low density polyethylene foam represented by the performance curve 62. As illustrated in FIG. 4, the low density polyethylene foam represented by the performance curve 62 supports a higher load or stress than the two polyethylene foam extrusion profiles represented by the performance curves 64, 66 of the same or similar density. Further, as illustrated in FIG. 4, the polyethylene foam extrusion profile represented by the performance curve 64 illustrates strain for a given stress that has a greater propensity to support a higher loading than the exemplary polyethylene foam extrusion profile represented by the performance curve 66. Thus, a thermoplastic foam profile can be engineered to be less supportive in the unitary composite cushioning structure 48 depending on the support characteristics for the unitary composite cushioning structure 48 desired.

Figure 5:
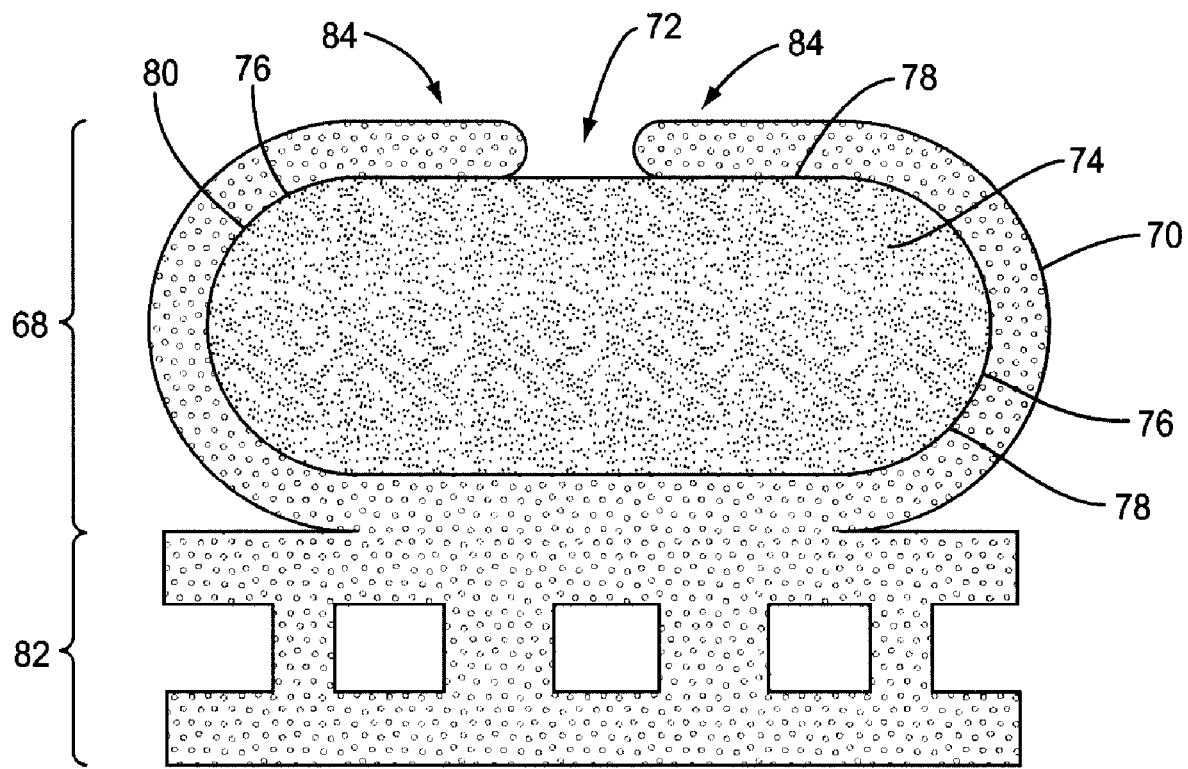
FIG. 5 is a side view of a cross-section of another exemplary cellular thermoset foam profile substantially surrounded by and cohesively or adhesively bonded to a cellular thermoplastic foam and a stratum disposed therebetween, to form a unitary composite cushioning structure.

In this regard, embodiments disclosed herein allow a unitary composite cushioning structure to be provided in a customized engineered profile by providing a customized engineered thermoplastic foam profile. A thermoset material is provided in the engineered thermoplastic foam profile to provide the unitary composite cushioning structure. In this manner, the shape and resulting characteristics of the unitary composite cushioning structure can be designed and customized to provide the desired combination of resiliency and cushioning, and support characteristics for any application desired. In this regard, FIG. 5 is a side view of a cross-section of another exemplary unitary composite cushioning structure 68 to further illustrate, by example, providing an engineered cellular thermoplastic foam profile to provide the desired support characteristics and so that the geometry of the unitary composite cushioning structure 48 can be provided, as desired. As illustrated in FIG. 5, the unitary composite cushioning structure 68 includes a cellular thermoplastic foam profile 70 profiled in the form of a C-shaped structure having an open chamber 72 disposed therein formed as a result of extruding a solid block of cellular thermoplastic foam. A base 82 is also extruded with the C-shaped structure as part of the cellular thermoplastic foam profile 70 in this embodiment. The base 82 may provide a firm lower support layer for the unitary composite cushioning structure 68, although such as is not required. Note, however, there is not a requirement to provide the base 82 as part of the thermoplastic foam profile 70.

A thermoset material 74 is disposed in the open chamber 72 to provide the unitary composite cushioning structure 68. The thermoset material 74 may be disposed in the open chamber 72 when in a non-solid phase, as previously discussed. The thermoset material 74 will eventually transform into a solid phase and cohesively or adhesively bond with the cellular thermoplastic foam profile 70 to form the unitary composite cushioning structure 68. A stratum 76 is formed where an outer surface 78 of the thermoset material 74 contacts or rests against an inner surface 80 of the cellular thermoplastic foam profile 70 to cohesively or adhesively bond the thermoset material 74 to the cellular thermoplastic foam profile 70.

The cellular thermoplastic foam profile 70 may be a closed-cell foam, open-cell foam, or partially open or closed-cell foam. The material selected for providing the cellular thermoplastic foam profile 70 may be from any thermoplastic material desired, including those previously described. The thermoset material 74 may also be a cellular foam, and may be closed-cell foam, open-cell foam, or partially open or closed-cell foam. The material selected for providing the cellular thermoset foam may be from any thermoset material desired, including those previously described above.

The cellular thermoplastic foam profile 70, the thermoset material 74, and the unitary composite cushioning structure 68 may have the responses represented by the performance curves 42, 44, and 46 in FIG. 2, respectively, as an example. For example, the response shown by the performance curve 42 in Section I of FIG. 2 may be the response curve of the cellular thermoplastic foam profile 70 illustrating an initial soft segment generated from the lack of resistance exhibited by C-shaped legs 84 of the cellular thermoplastic foam profile 70. The supportive segments of the C-shaped legs 84 begin to engage with the bottom of the cellular thermoplastic foam profile 70 and therefore are able to tolerate a large load or pressure factor, as illustrated by the performance curve 42 in Sections II and III in FIG. 2. The thermoset material 74 in the unitary composite cushioning structure 68 shows an extremely soft segment in the performance curve 44 in Section I of FIG. 2, with a lower loading factor, until it becomes fully compressed or collapsed onto itself in Section III in FIG. 2. As illustrated by performance curve 44 in FIG. 2, the unitary composite cushioning structure 68 shows an overall smooth transition between a smaller pressure or load, as illustrated in Section I of FIG. 2, progressing into a harder, more supportive structure, as illustrated in Sections II and III of FIG. 2.

Figure 6:
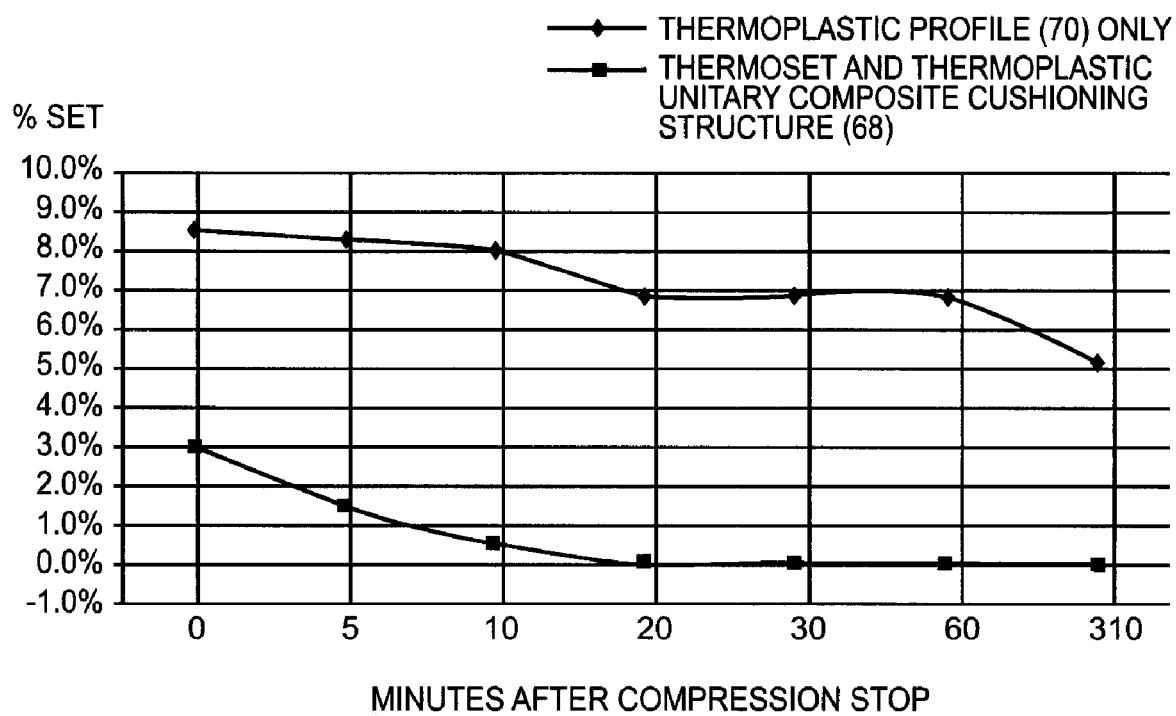
FIG. 6 is an exemplary chart illustrating the recovery characteristics of the unitary composite cushioning structure of FIG. 5 versus the recovery characteristics of the cellular thermoplastic foam profile of FIG. 5 over elapsed time to illustrate the improved compression set characteristics of the unitary composite cushioning structure over the cellular thermoplastic foam profile.

FIG. 6 is an exemplary chart 90 illustrating the recovery characteristics of the unitary composite cushioning structure 68 of FIG. 5 versus the recovery characteristics of the cellular thermoplastic foam profile 70 of FIG. 5 individually over elapsed time to illustrate the improved compression set characteristics of the unitary composite cushioning structure 68. The test protocol was to approximate the load exerted by a person lying prone on a cushion structure, then apply this constant strain for up to eight (8) hours, then measure the height recovery of the unitary composite cushioning structure 68 over time. While the cellular thermoplastic foam profile 70 does not recover within the same time frame as the unitary composite cushioning structure 68 in this example, it is important to note when the cellular thermoplastic foam profile 70 is used in combination with the thermoset material 74, not only is there less initial set, but the rate of recovery is more rapid. The rate of recovery feature of the unitary composite cushioning structure 68 is important from the standpoint of assuring that the unitary composite cushioning structure 68 returned or substantially returned to its original positioning, and that sag of the unitary composite cushioning structure 68 was not evident.

The unitary composite cushioning structure disclosed herein can be disposed in any number of applications for providing support to a load. Examples include seat assemblies, cushions, helmets, mats, grips, packagings, and bolsters. The remainder of this disclosure provides exemplary applications in which the unitary composite cushioning structure or structures can be disposed to provide the desired combined support and resiliency and cushioning characteristics.

Figure 7:
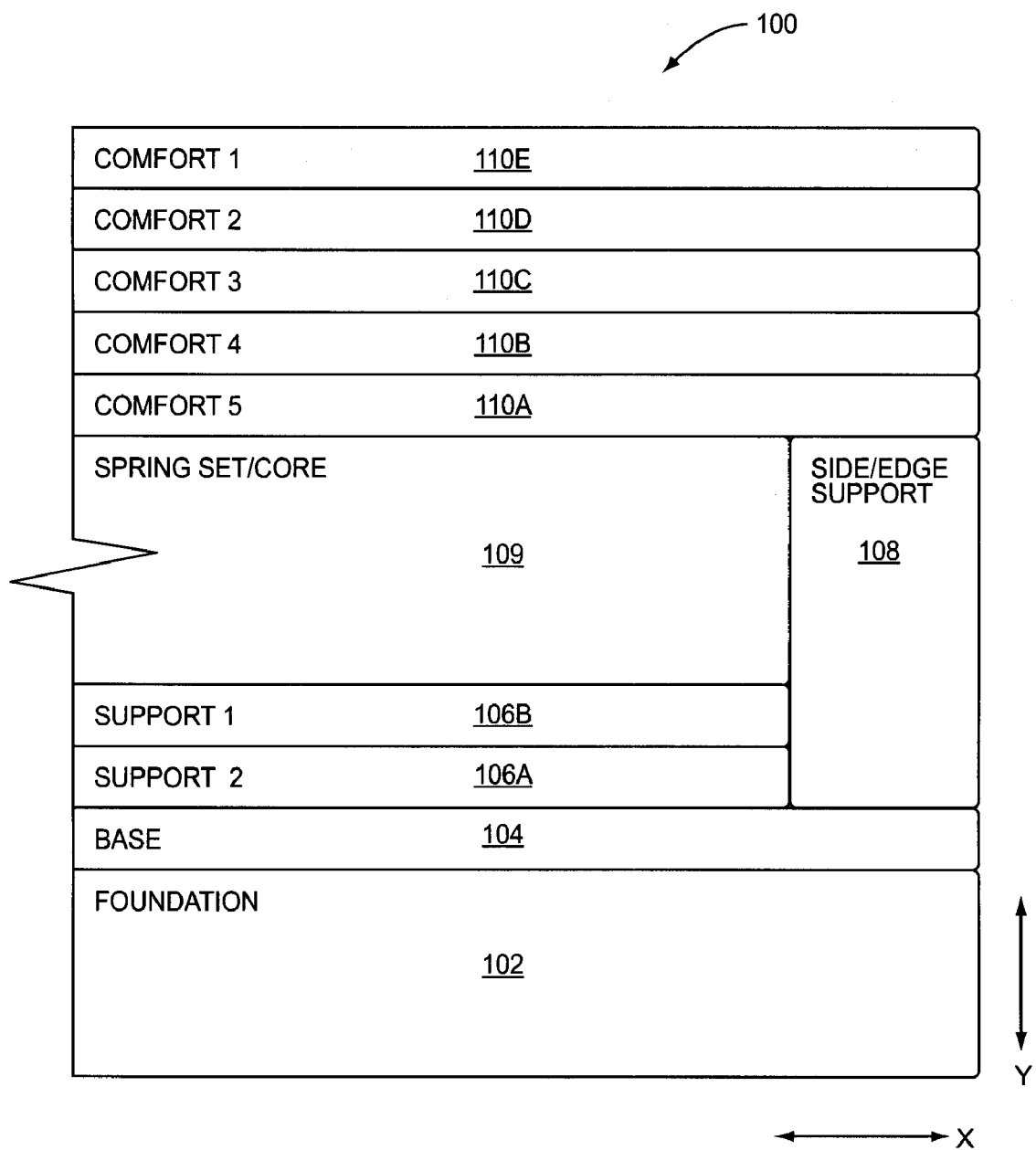
FIG. 7 is a cross-section of an exemplary mattress illustrating various cushioning layers where a unitary composite cushioning structure according to exemplary embodiments disclosed herein may be deployed.

In this regard, FIG. 7 illustrates a block diagram of an exemplary mattress 100. The mattress 100 is a well known example of a loading bearing structure. The unitary composite cushioning structures disclosed herein may be incorporated as replacements into any of the components of the mattress 100 (also referred to as "mattress components"), which are described below. Further, the unitary composite cushioning structures disclosed herein may form a portion of any of the components of the mattress 100. In this regard, the mattress 100 may include a foundation 102. A base 104 may be disposed on top of the foundation 102. The base 104 in this embodiment is a horizontal mattress component, meaning it extends in the horizontal or X direction extending generally parallel to an expected load displaced in the mattress 100. The foundation 102 and the base 104 may be selected to provide a firm support for a load disposed on the mattress 100. Additional support layers 106A, 106B, which may also be horizontal mattress components, may be disposed on top of the base 104 to provide an internal support area. In order to provide a firmer outer edge of the mattress 100, side or edge supports 108 may be disposed around the perimeter of the base 104 and foundation 102 and located adjacent to the support layers 106A, 106B and a spring set or core 109. The side or edge supports 108 may be characterized as vertical mattress components in this embodiment, since the side or edge supports 108 extend upward in a Y direction towards an expected load disposed on the mattress 100 and do not extend substantially in the horizontal or X direction of the mattress. The spring set or core 109, which may also be characterized as vertical mattress components, may be provided as an innerspring comprised of coils, which may be secured by a border wire (not shown), or may be pocketed coils, as examples. Alternatively, a core, such as comprised of latex or memory foam, may be disposed on the support layers 106A, 106B. One or more comfort layers 110A-110E may be disposed on top of the spring set or core 109 to complete the mattress 100.

As another example, FIGS. 8A and 8B are perspective and side views, respectively, of an exemplary unitary composite cushioning structure 120 provided in a comfort layer that can be disposed in a mattress or mattress assembly. In this embodiment, the unitary composite cushioning structure 120 is comprised of a plurality of extruded cellular thermoplastic foam profiles 122A-122J. The material choices and support characteristics of the cellular thermoplastic foam profiles 122A-122J can be varied, if desired, to provide different support characteristics in the unitary composite cushioning structure 120 to provide different zones or regions of support characteristics. For example, the unitary composite cushioning structure 120 may be designed to support different loads in different portions of the unitary composite cushioning structure 120 such that it may be desired to provide firmer or greater support in certain cellular thermoplastic foam profiles 122A-122J than others. For example, certain cellular thermoplastic foam profiles 122A-122J may be located where head, torso, and foot loads will likely be displaced.

Figure 9:
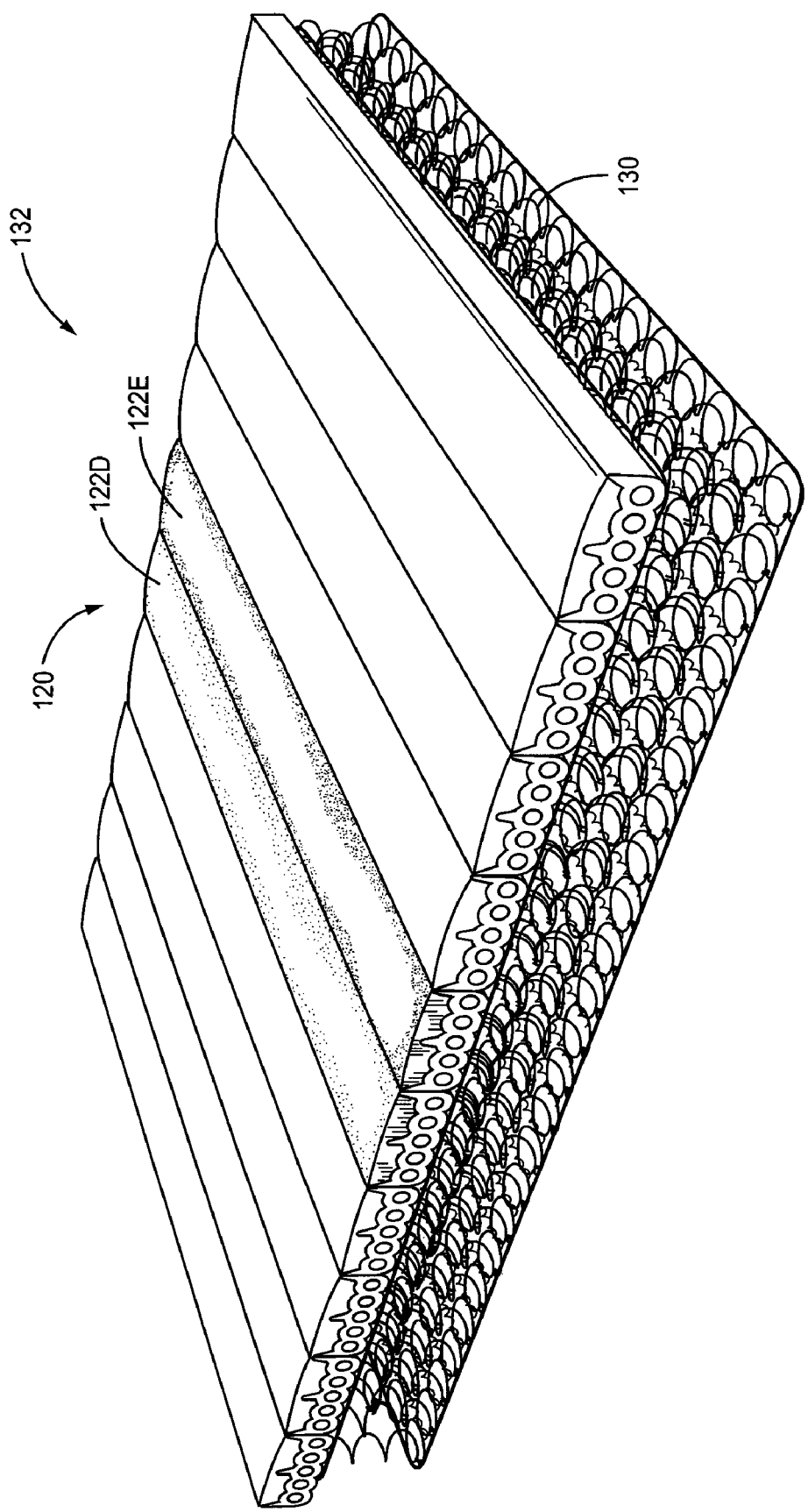
FIG. 9 is a perspective view of the unitary composite cushioning structure of FIGS. 8A and 8B disposed on top of a mattress innerspring to provide a padding material for the mattress innerspring.
Figure 10:
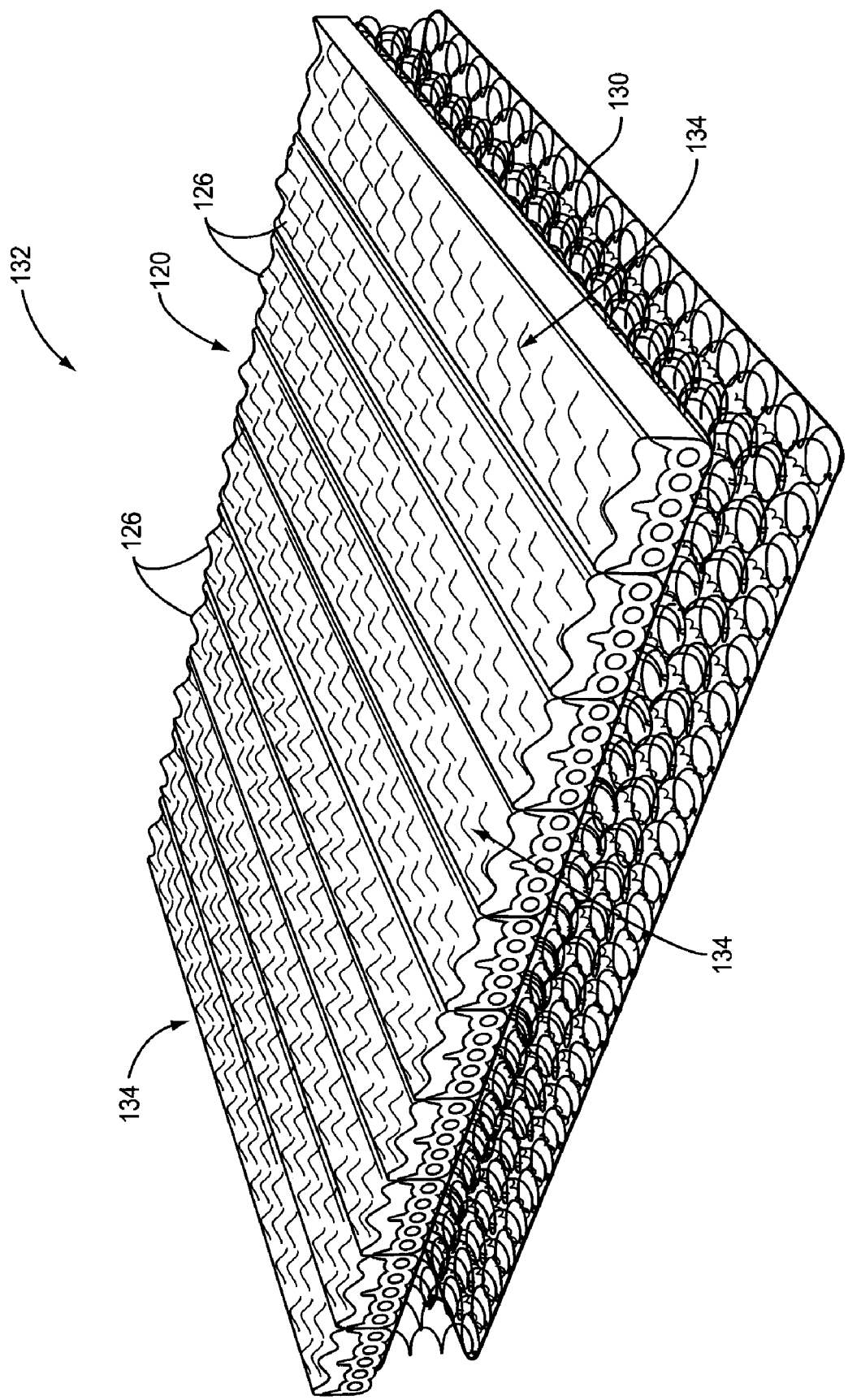
FIG. 10 is a perspective view of another exemplary unitary composite cushioning structure comprised of a molded thermoplastic foam profile incorporating chambers with a thermoset material disposed in the chambers and a stratum provided therebetween, with a top surface of the thermoset material including convolutions to provide zoned cushioning characteristics in a sleep or seat surface.

The cellular thermoplastic foam profiles 122A-122J in this embodiment each include open chambers 124 that are configured to receive a thermoset material 126 to provide the unitary composite cushioning structure 120, as illustrated in FIGS. 8A and 8B. Stratums 128 are disposed therebetween where the thermoset material 126 is cohesively or adhesively bonded to the cellular thermoplastic foam profiles 122A-122J. The cushioning properties of the thermoset material 126 can be selected and be different for the cellular thermoplastic foam profiles 122A-122J, if desired, to provide variations in cushioning characteristics of the unitary composite cushioning structure 120. FIG. 9 illustrates the unitary composite cushioning structure 120 provided as a support layer disposed on top of an innerspring 130 as part of a mattress assembly 132. In this example, certain of the cellular thermoplastic foam profiles 122D, 122E are designed to provide lumbar support for the mattress assembly 132. Other variations can be provided. For example, as illustrated in FIG. 10, convolutions 134 can be disposed in the thermoset material 126 to provide designed resiliency and support characteristics. The convolutions 134 are not disposed at the stratum 128 in this embodiment.

Figure 11:
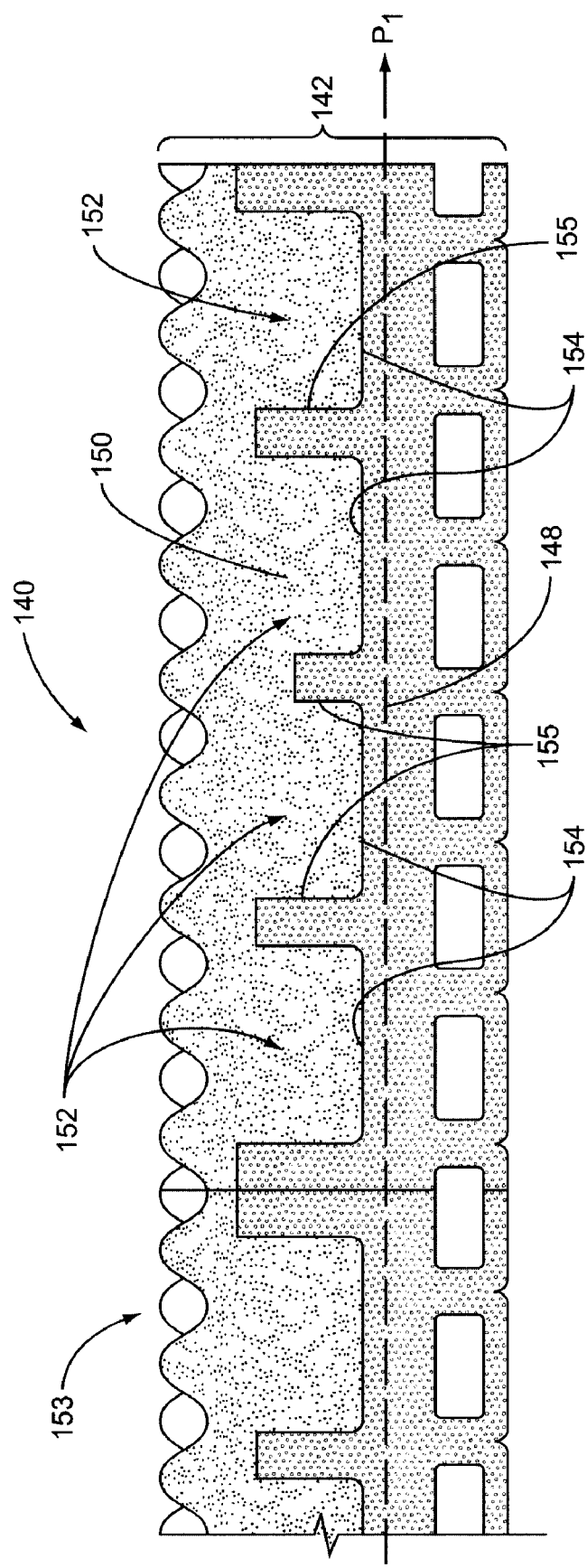
FIG. 11 is an exemplary cross-section profile of another exemplary unitary composite cushioning structure comprised of a cellular thermoplastic foam profile incorporating chambers with a thermoset material disposed in the chambers and a stratum provided therebetween, and that may be employed to provide zoned cushioning characteristics in a sleep or seat surface.

FIG. 11 is another exemplary cross-section profile of a mattress 140 employing a unitary composite cushioning structure 142 for a bedding or seating cushioning application. In this embodiment, a base 144 is extruded as part of a cellular thermoplastic foam profile 148 provided in the unitary composite cushioning structure 142 for the mattress 140. The unitary composite cushioning structure 142 is provided from a composite of the cellular thermoplastic foam profile 148 and a thermoset material 150 disposed in open channels 152 of the cellular thermoplastic foam profile 148, with a stratum 154 disposed therebetween. The open channels 152 are provided as extensions 155 that extend generally orthogonally from a longitudinal plane $P_1$ of the cellular thermoplastic foam profile 148. Further, in this embodiment, convolutions 153 are provided in the thermoset material 150, similar to those provided in FIG. 10 (element 134). The cellular thermoplastic foam profile 148 and the thermoset material 150 may be provided according to any of the previously described examples and materials. The unitary composite cushioning structure 142 may be provided according to any of the examples and processes described above.

Figure 12:
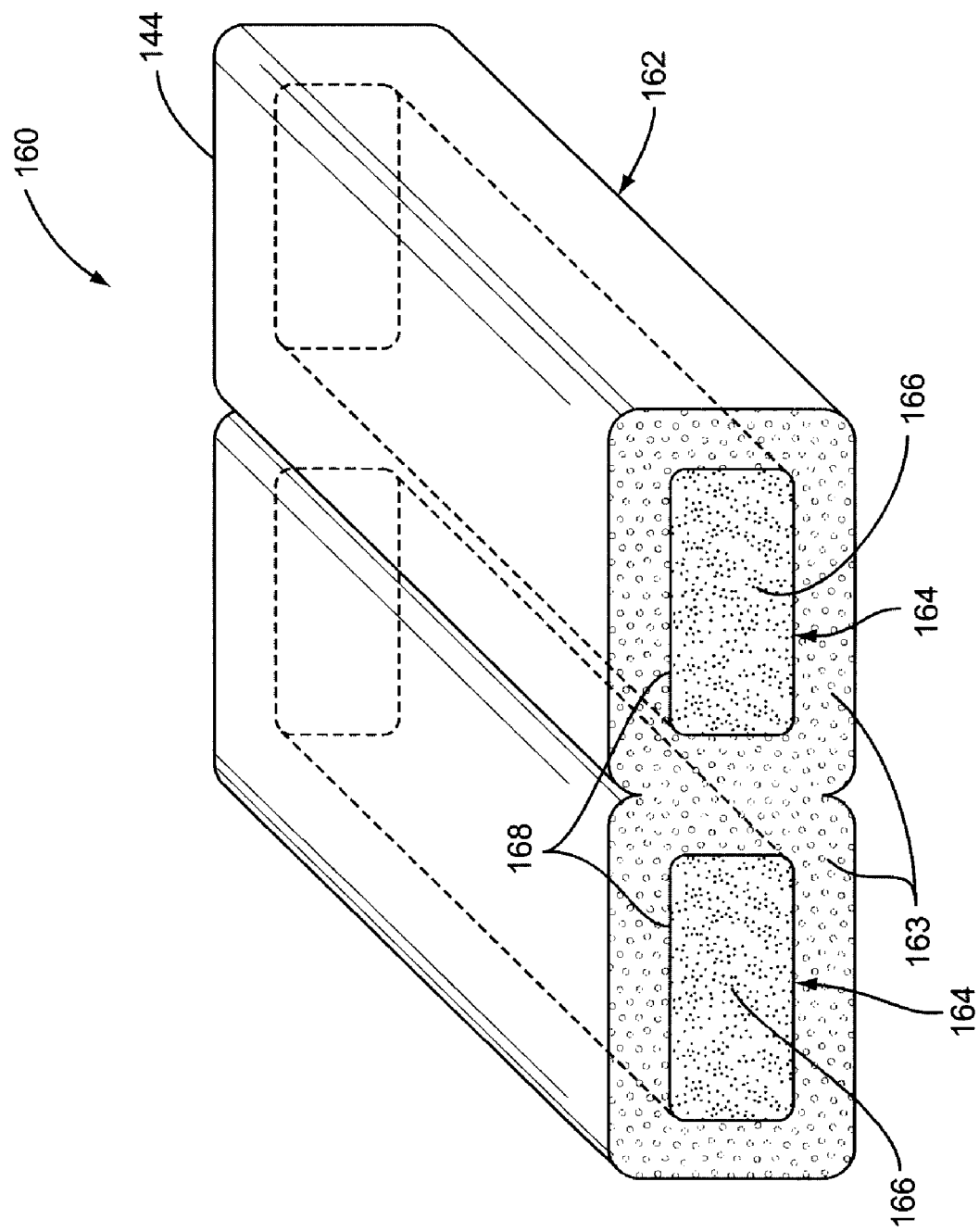
FIG. 12 is an exemplary cross-section profile of another exemplary unitary composite cushioning structure comprised of a cellular thermoplastic foam profile having extruded closed chambers with a thermoset material disposed in the chambers and a stratum provided therebetween that may be employed to provide a cushioning structure, including but not limited to a sleep or seat surface and edge or side supports.

As previously discussed above, other components of a mattress may also be provided with a unitary composite cushioning structure according to embodiments disclosed herein. For example, FIG. 12 illustrates a portion of the base 144 in FIG. 11, but provided as a unitary composite cushioning structure 160 comprised of a cellular thermoplastic foam profile 162 comprised of a thermoplastic material 163 having closed channels 164 disposed therein. A thermoset material 166 is disposed in the closed channels 164 and cohesively or adhesively bonded to the cellular thermoplastic foam profile 162 at a stratum 168 disposed therebetween. The unitary composite cushioning structure 160 and the cellular thermoplastic foam profile 162 and thermoset material 166 may be provided according to any of the previously described examples and materials. The unitary composite cushioning structure 160 could be provided as other supports in the mattress 100, including but not limited to side, edge, or corner supports.

The embodiments of unitary composite cushioning structures described thus far have provided an outer thermoplastic material with a thermoset material disposed therein. However, the embodiments disclosed herein are not limited to this configuration. The unitary composite cushioning structure could be formed such that a thermoset material is disposed on the outside, partially or fully, of a thermoplastic material. For example, the thermoset material could partially or fully encapsulate the thermoplastic material.

Figure 13:
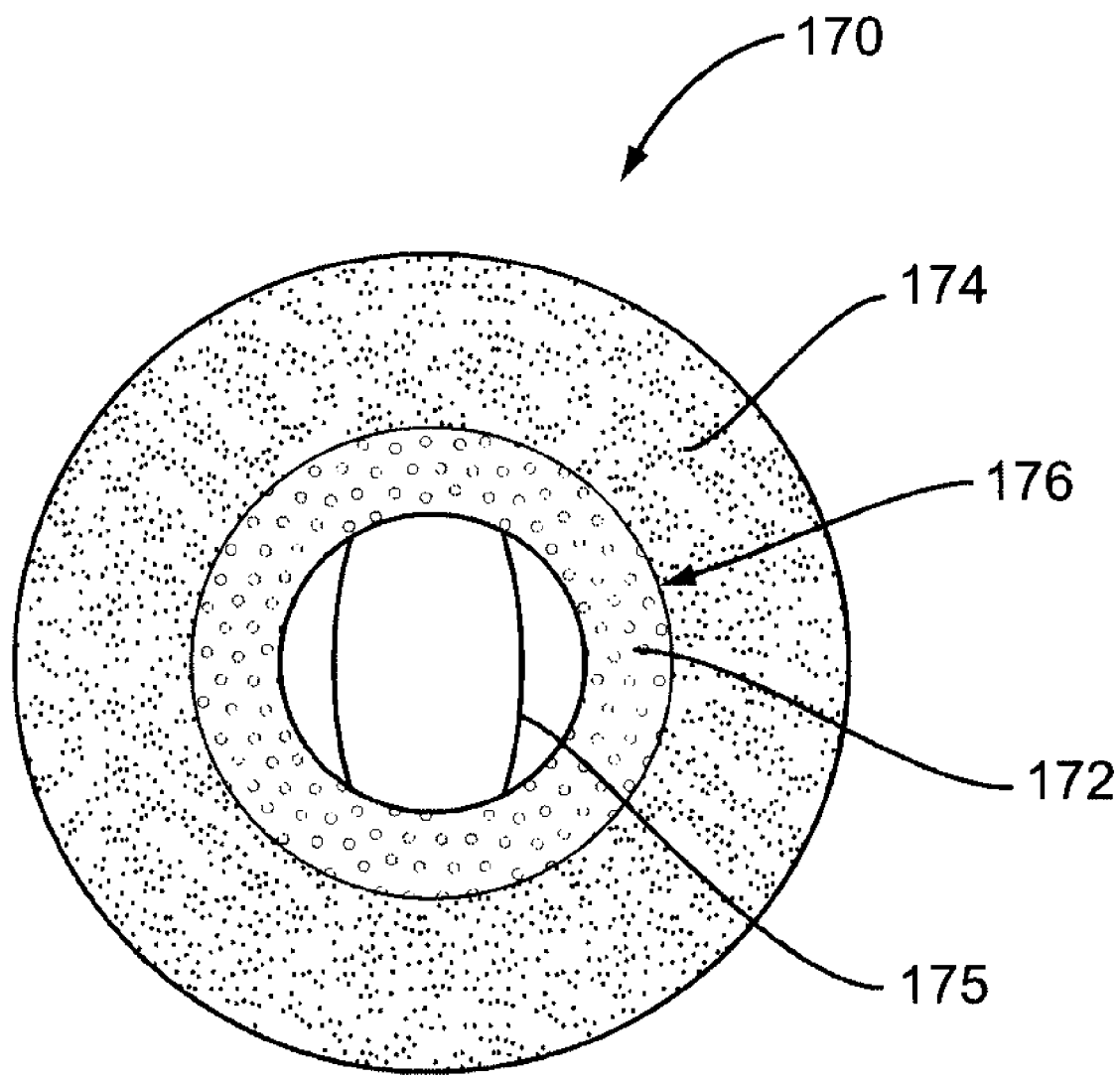
FIG. 13 is a top view of an exemplary unitary composite cushioning structure comprised of a cellular thermoplastic foam profile surrounded by a thermoset material.

In this regard, FIG. 13 illustrates an exemplary embodiment of a unitary composite cushioning structure 170 comprised of one or more thermoplastic closed and/or open cell foam 172 embedded in and/or substantially surrounded by a closed and/or open cell thermoset foam 174. The unitary composite cushioning structure 170 may be used as a cushion structure. As illustrated therein, the thermoplastic foam 172 is provided as an engineered cylindrically-shaped cellular thermoplastic foam profile 176 geometrically designed in a vertical profile. The cellular thermoplastic foam profile 176 provides a controlled deformation support characteristic and stability to the unitary composite cushioning structure 170. To form the unitary composite cushioning structure 170, the cellular thermoplastic foam profile 176 is surrounded by the thermoset foam 174, which in this example is a foamed latex rubber. The thermoset foam 174 may be elastomeric. The foamed latex rubber as the thermoset foam 174 may be manufactured from an emulsion of latex rubber as one possible example. An inner cylindrical chamber 175 is left in the cellular thermoplastic foam profile 176, which can either be left void or a thermoset material (not shown), such as foamed latex rubber for example, poured inside the inner cylindrical chamber 175 to provide additional offset of compression.

A curing process can be performed on the unitary composite cushioning structure 170 to set and cohesively or adhesively bond the thermoplastic foam 172 and the thermoset foam 174 to each other. The thermoset foam 174 is not chemically bonded to the thermoplastic foam 172 in this embodiment, but chemical bonding can be provided. Further, a chemical bonding agent can be mixed in with a thermoplastic material before or during the foaming process to produce the thermoplastic foam 172, or when the thermoset foam 174 is poured into the inner cylindrical chamber 175 to provide a chemical bond with the thermoset foam 174 during the curing process.

The unitary composite cushioning structure 170 has a geometry that can be used in a vertical position relative to an overall structure providing individual spring qualities to an otherwise unitary or monolithic structure that is both stable due to the thermoplastic foam 172 and exhibits excellent offset of compression set due to the thermoset foam 174. For example, the unitary composite cushioning structure 170 may be used like a spring and in place of metal or other types of springs or coils. Further, a thermoplastic foam may be provided to encapsulate the thermoset foam 174 to provide additional support to the unitary composite cushioning structure 170.

For example, the unitary composite cushioning structure 170 may be used as a foam spring for use in a knock down or buildable mattress. Also, this unitary composite cushioning structure 170 can be used to add support into specific regions of a cushion structure to satisfy individual demands, such as lumbar and/or head and foot support as examples, depending on the type of cushion structure used while providing the tactile cushioning characteristic desired. The thermoset foam 174 has cushioning abilities and can be soft or firm depending on formulations and density, but without individualized resilient support zones as can be obtained from using the engineered geometrically supportive profiles of the thermoplastic foam 172. This engagement of the thermoplastic foam 172 and the thermoset foam 174 has the ability to recover over long periods of repeated deformations.

In this unitary composite cushioning structure 170, the thermoplastic foam 172 could be a foamed polymer from including, but not limited to polyethylene, an EVA, a TPO, a TPV, a PVC, a chlorinated polyethylene, a styrene block copolymer, an EMA, an ethylene butyl acrylate (EBA), and the like, as examples. These thermoplastic materials may also be inherently resistant to microbes and bacteria, making them desirable for use in the application of cushioning structures. These materials can be also made biodegradable and fire retardant through the use of additive master batches. The thermoplastic could be foamed to an approximate cell size of 0.25 to 2.0 mm, although such is not required or limiting to the scope of the embodiments disclosed herein.

The thermoset foam 174 in this example is foamed latex rubber and is hypoallergenic, and breathes to keep you warm in the winter and cool in the summer. Further, bacteria, mildew, and mold cannot live in the foamed latex rubber. The thermoset foam 174 is generally obtained in emulsified form and is frothed to introduce air into the emulsion to reduce density, and is then cured (vulcanized) to remove additional waters and volatiles as well as to set the material to its final configuration. Latex, however, may only be possible to be foamed (density reduction) down to a 5 lb. or 80 kg/$m^3$ range without sacrificing other desirable features, such as tear and tensile strength. However, when engineered with the inner foam, which can be foamed to densities down to 1 lb. and/or 16 kg/$m^3$ effectively, the inner foam is used in combination with the foamed latex rubber and can displace the heavier weight of the foamed latex rubber. The foamed latex rubber can also be further cost reduced through the addition of fillers such as ground foam reclaim materials, nano clays, carbon nano tubes, calcium carbonate, flyash and the like, but also corc dust as this material can provide for increased stability to the thermoset material to while reducing the overall density, weight, and/or cost of the thermoset material.

Figure 14:
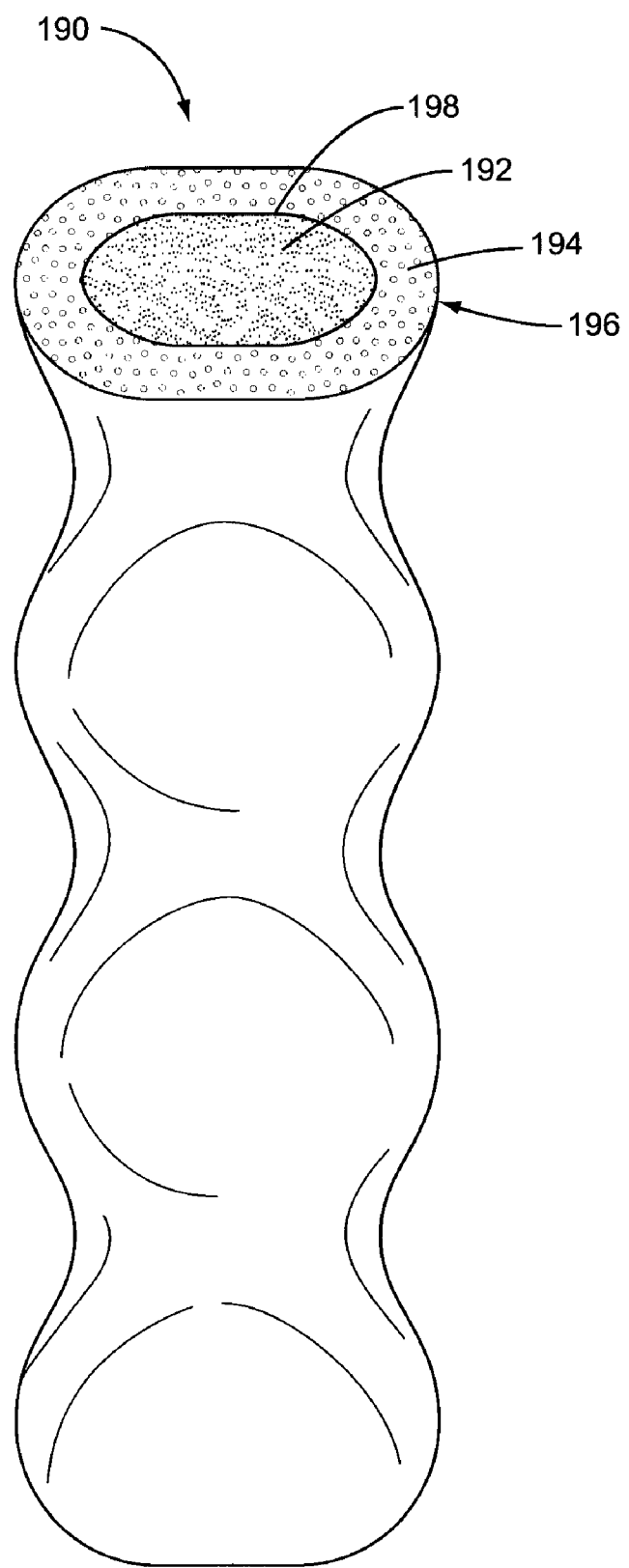
FIG. 14 is a top perspective view of exemplary unitary composite cushioning structure comprised of a coil-shaped cellular thermoplastic foam profile having an internal chamber with a thermoset material disposed in the chamber of the cellular thermoplastic foam profile.

In another embodiment, as illustrated in FIG. 14, another unitary composite cushioning structure 190 may be manufactured. In this embodiment, the unitary composite cushioning structure 190 also has a vertical geometric profile similar to the unitary composite cushioning structure 170 of FIG. 13. This allows for controlled deformation relative to the unitary composite cushioning structure 190 providing individual spring qualities to an otherwise monolithic structure. However, in this embodiment, an inner thermoset foam 192 is provided and geometrically designed in a vertical profile surrounded by an outer thermoplastic foam 194 provided in a cellular thermoplastic foam profile 196. A stratum 198 is disposed therebetween wherein the outer thermoplastic foam 194 is cohesively or adhesively bonded to the inner thermoset foam 192.

The inner thermoset foam 192 may be manufactured from an emulsion of latex rubber as an example. The unitary composite cushioning structure 190 has a geometry that can be used in a vertical position relative to an overall structure providing individual spring qualities to an otherwise monolithic structure. For example, the unitary composite cushioning structure 190 may be used like a spring and in place of metal or other types of springs. For example, one aspect would be the use of the unitary composite cushioning structure 190 as a pocketed coil assembly for a mattress or other application in a similar fashion to the current metal coil spring variety and covered with the appropriate cloth structure in similar fashion to the metal coil spring design. The materials and application possibilities discussed for the unitary composite cushioning structure 170 of FIG. 13 are also possible for the unitary composite cushioning structure 190 of FIG. 14 and thus will not be repeated here.

In the unitary composite cushioning structure 190 of FIG. 14, the outer thermoplastic foam 194 can be hypo-allergenic, and breathes to retain heat in the winter and to release heat in the summer. The inner thermoset foam 192 can be obtained in emulsified form and is frothed to introduce air into the emulsion to reduce density, and is then cured (vulcanized) to remove additional waters and volatiles as well as to set the material to its final configuration. The other possibilities discussed for the thermoset foams discussed above are also possible for the inner thermoset foam 192 of FIG. 14 and thus will not be repeated here.

The inner thermoset foam 192 could be a foamed polymer from a polyethylene, an EVA, a TPO, a TPV, a PVC, a chlorinated polyethylene, a styrene block copolymer, an EMA, an ethylene butyl acrylate (EBA), and the like, as examples, or any of the other recited thermoplastics previously discussed. These thermoplastic materials may also be inherently resistant to microbes and bacteria, making them desirable for use in the application of cushioning structures. These materials can be also made biodegradable and fire retardant through the use of additive master batches. The thermoplastic could be foamed to an approximate cell size of 0.25 to 2.0 mm, although such is not required or limiting to the scope of the embodiments disclosed herein. These foam springs of thermoplastic open or closed cell foam can be interspersed at some frequency throughout the cushion structure. The foam springs may be formed as an array. Further, a thermoset material, including but not limited to latex rubber, may also be provided to encapsulate the cellular thermoplastic foam profile 196 of the unitary composite cushioning structure 190 to provide additional offset of compression.

Figure 15:
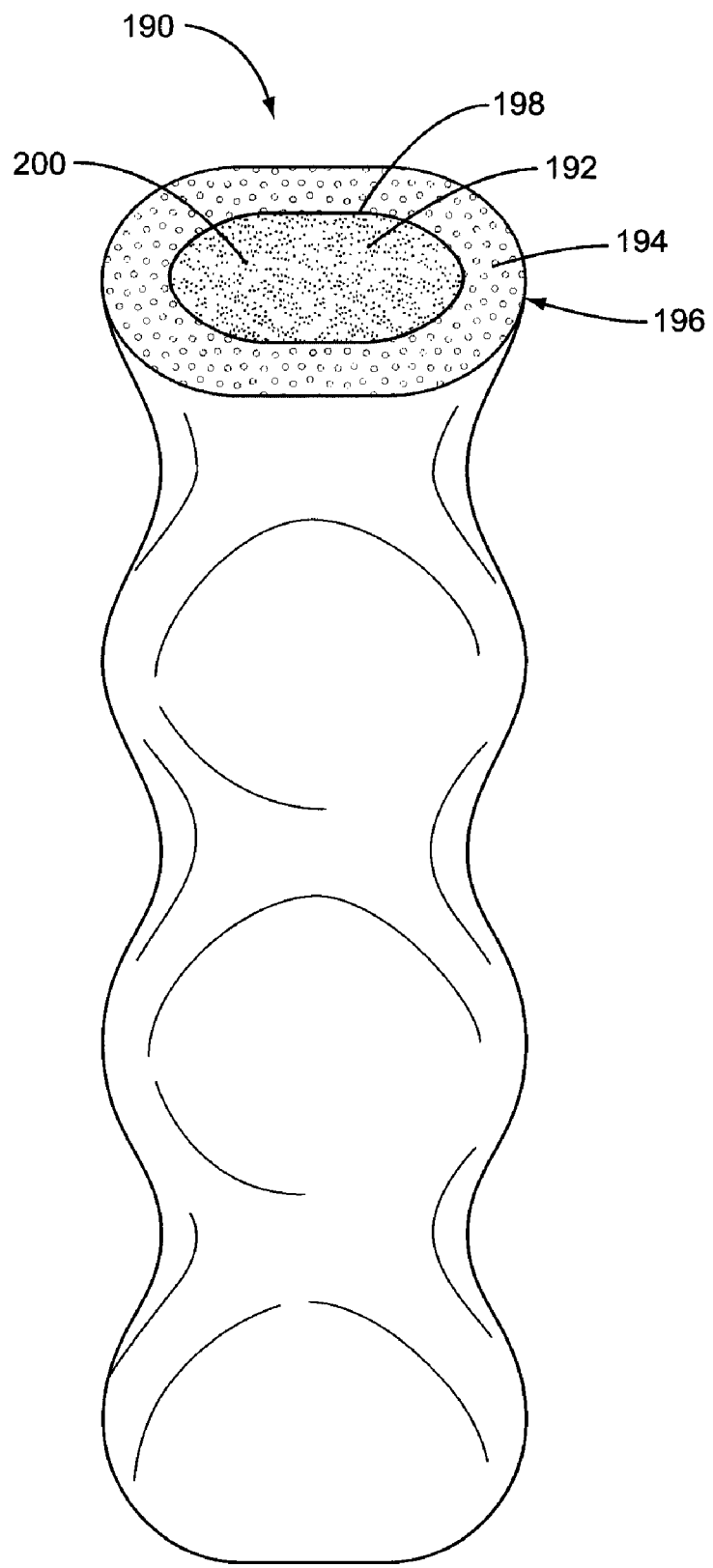
FIG. 15 is a top perspective view of the unitary composite cushioning structure in FIG. 14 with an additional filler material in the form of core dust mixed with the thermoset material to provide stability to the thermoset material.

FIG. 15 illustrates the unitary composite cushioning structure 190 of FIG. 14, but the inner thermoset foam 192 additionally includes a filler material, which in this example is corc dust 200. The corc dust 200 adds stability to the inner thermoset foam 192 without changing the cushioning characteristics and benefits of the thermoplastic material and reduces weight of the unitary composite cushioning structure 190. For example, the amount of corc dust 200 added per unit of latex rubber may be 25% to 75%, although this range is only exemplary and is not limiting to the scope of the embodiments disclosed herein.

Figure 16:
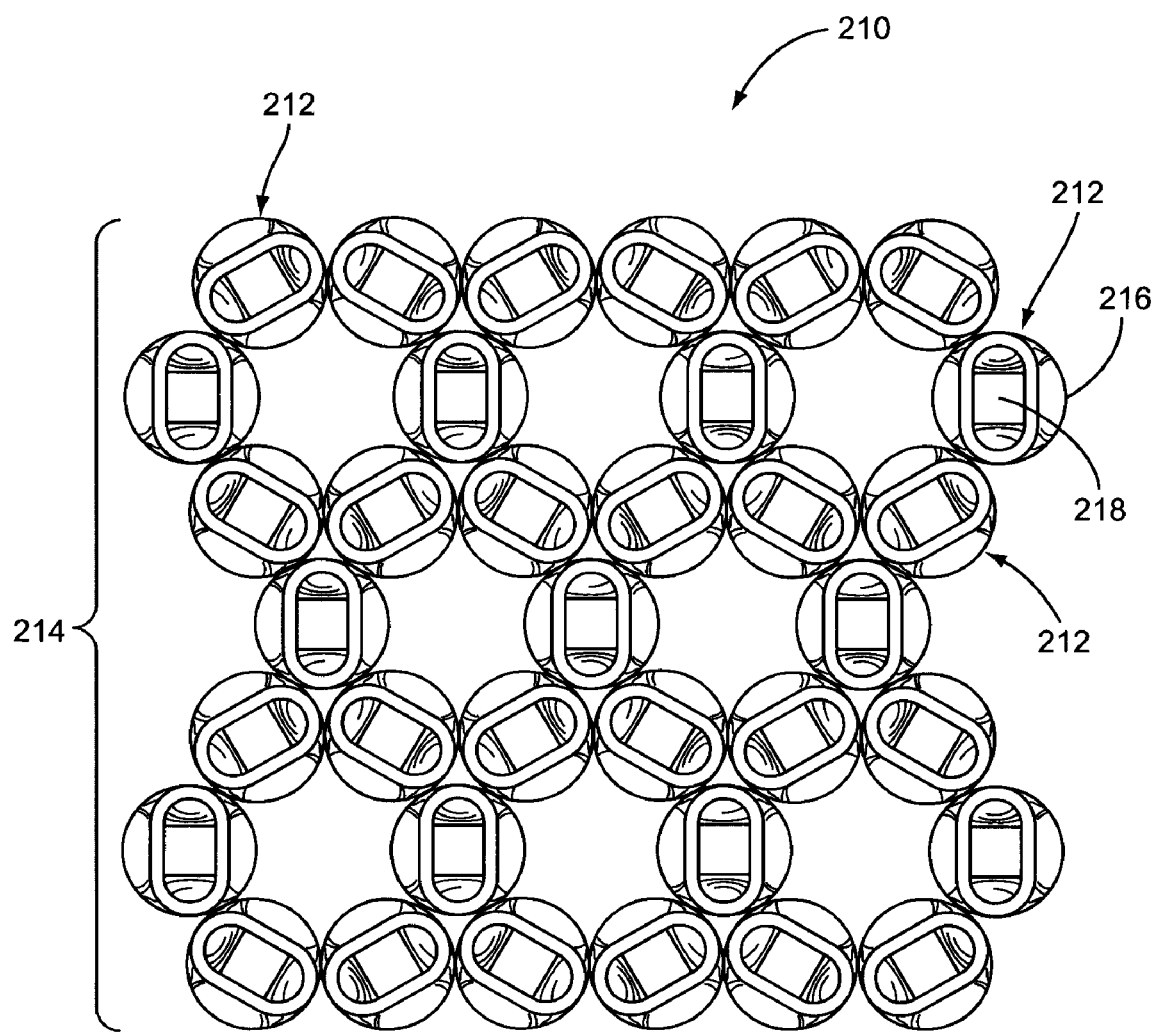
FIG. 16 is a top view of a plurality of exemplary unitary composite cushioning structures provided in an array.

FIG. 16 illustrates yet another embodiment of a structure 210 that can be used to form one or more unitary composite cushioning structures 212, including according to any of the embodiments disclosed herein. In this embodiment, a plurality of unitary composite cushioning structures 212 is provided in an array 214. Each unitary composite cushioning structure 212 is comprised of an outer foam piece 216 comprised of a foamed thermoplastic material. The outer foam pieces 216 have internal chambers 218 that can be filled with a thermoset material. Further, corc dust or other filler may be added to the thermoset material poured inside the internal chambers 218 of the outer foam pieces 216 to provide the unitary composite cushioning structure 212. The outer foam pieces 216 can also be encapsulated either internally, externally, or both with a cellular thermoset foam or other thermoset material.

Figure 17:
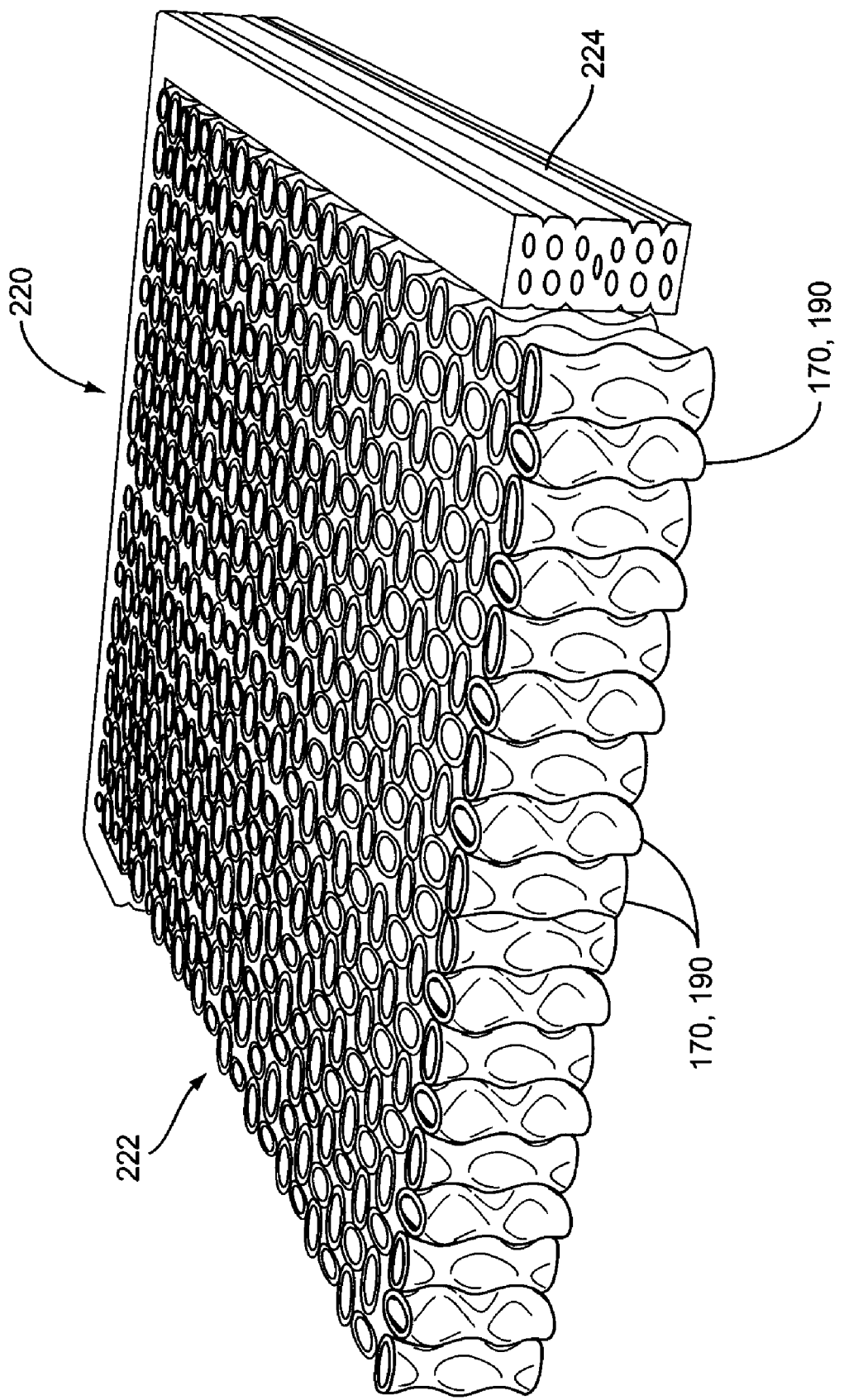
FIG. 17 is a side perspective view of a mattress innerspring employing exemplary coil-shaped unitary composite cushioning structures, which may include the composite coil structures of FIGS. 13-15.
Figure 18A:
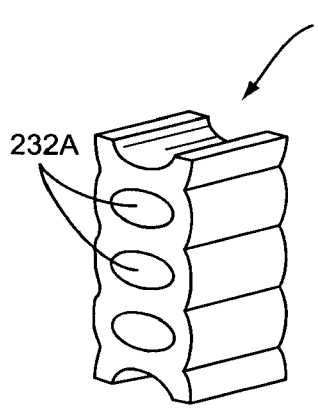
FIGS. 18A-18I are side perspective views of alternative cellular thermoplastic foam profiles that can either be encapsulated or filled with a thermoset material to provide unitary composite cushioning structures.
Figure 18B:
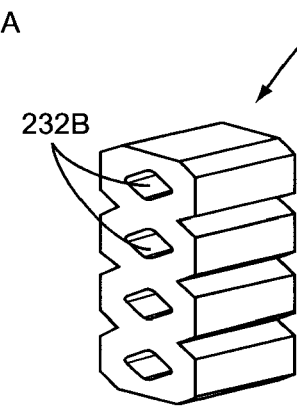
Figure 18C:
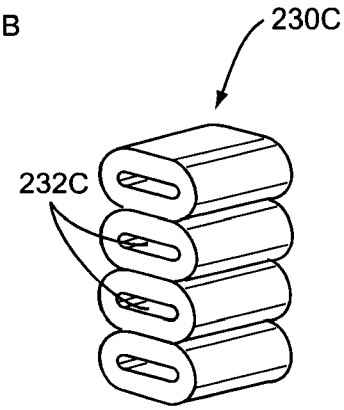
Figure 18D:
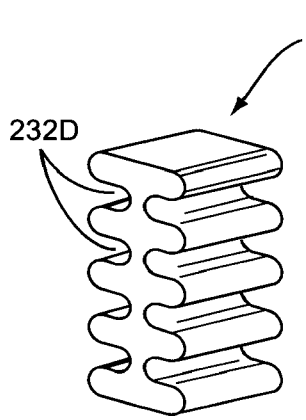
Figure 18E:
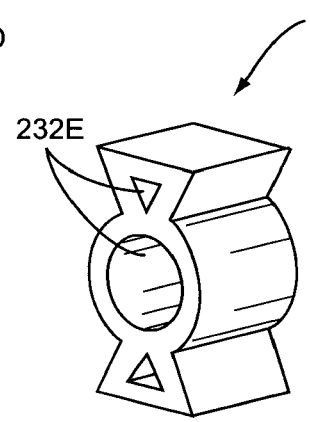
Figure 18F:
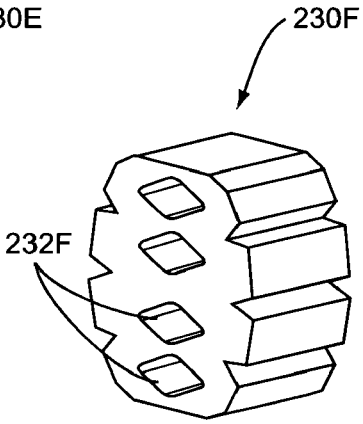
Figure 18G:
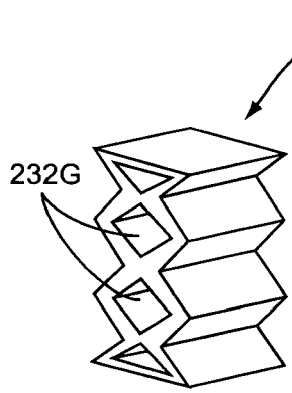
Figure 18H:
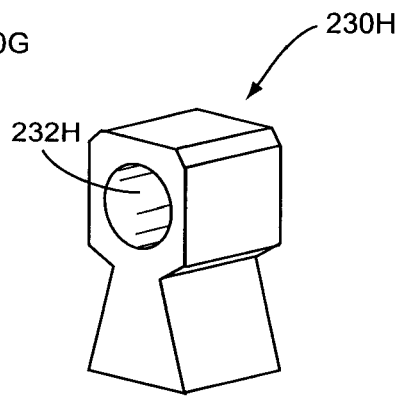
Figure 18I:
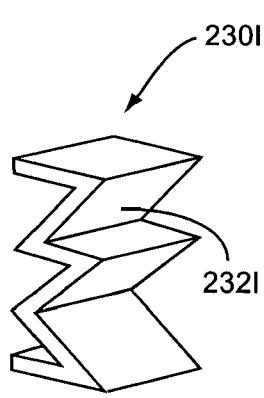

FIG. 17 illustrates yet another embodiment of a mattress assembly 220 that can incorporate the unitary composite cushioning structures like the unitary composite cushioning structures 170 or 190 previously described above. In this embodiment, the unitary composite cushioning structures 170 or 190 are used to replace traditional coils or springs in an innerspring 222 as part of the mattress assembly 220. The unitary composite cushioning structures 170 or 190 are disposed inside and adjacent edge or side support profiles 224. The edge or side support profiles 224 may also be provided as a unitary composite cushioning structure according to any of the embodiments described herein and may also be encapsulated either internally, externally, or both with a thermoset material or foam. The edge or side support profiles 224 may provide an anti-roll off feature on a mattress or other bedding, as illustrated in the example in FIG. 17.

Other examples for the thermoplastic foam profiles that may be provided according to any of the embodiments disclosed herein for providing a unitary composite cushioning structure are illustrated in FIG. 18. As illustrated therein, thermoplastic foam profiles 230A-230I may be constructed out of a thermoplastic material including a foam. The thermoplastic foam profiles 230A-230I may have one or more chambers 232A-232I, which may be open or closed and which can either be left void or filled with a thermoset material to provide a unitary composite cushioning structure. The thermoplastic foam profiles 230A-230I can also be encapsulated with a thermoset material in addition to or in lieu of being filled with a thermoset material as part of a composite structure. All other possibilities for thermoplastic foam profiles, thermoset materials, and unitary composite cushioning structures discussed above are also possible for the thermoplastic foam profiles 230A-230I in FIG. 18.

Many modifications and other embodiments set forth herein will come to mind to one skilled in the art to which the embodiments pertain having the benefit of the teachings presented in the foregoing descriptions and the associated drawings. The thermoplastic engineered foam profiles may be used in concert with the thermoset materials either singularly and/or in combination with each other to provide unitary composite cushioning structures. A thermoset material can be encapsulated by a thermoplastic material, filled inside the thermoset material, or both. A thermoplastic material can be encapsulated by a thermoset material, filled inside the thermoplastic material, or both. Chemical bonding can be provided between the thermoset and thermoplastic materials. One aspect would be the use of the foam spring profile in concert with the thermoset material as an internal fill to be used in a pocketed coil assembly in a similar fashion to the current metal coil spring variety and covered with the appropriate cloth structure in similar fashion to the metal coil spring design. These composite structure profiles may be produced by direct continuous extrusion, extrusion injection molding, blow molding, casting, thermal forming, and the like, with the most efficient method being one of direct continuous extrusion.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A unitary composite cushioning structure formed from a cellular thermoplastic material and a cellular thermoset material, comprising:
   a cellular thermoplastic material providing support characteristics and cushioning characteristics;
   a cellular thermoset material providing a resilient structure with cushioning characteristics; and
   a stratum disposed between at least a portion of the cellular thermoplastic material and at least a portion of the cellular thermoset material formed and defined by a non-solid phase of the cellular thermoset material on a cellular thermoplastic foam profile, wherein the cellular thermoset material undergoes a transition into a solid phase intermixing with and comprising a direct chemical bond with the cellular thermoplastic material, to secure the at least a portion of the cellular thermoset material directly to the at least a portion of the cellular thermoplastic material to form the unitary composite cushioning structure exhibiting a combination of the support characteristics and the resilient structure with cushioning characteristics when the unitary composite cushioning structure is placed under a load.

2. The unitary composite cushioning structure of claim 1, wherein the support characteristics of the cellular thermoplastic material and the resilient structure with cushioning characteristics of the cellular thermoset material independently contribute to the combination of the support characteristics and the resilient structure with cushioning characteristics of the unitary composite cushioning structure.

3. The unitary composite cushioning structure of claim 1, wherein the cellular thermoplastic material is comprised from the group consisting of a cellular polypropylene foam, a cellular polypropylene copolymer foam, a cellular polystyrene foam, a cellular polyethylene foam, a cellular ethylene vinyl acetate (EVA) foam, a cellular thermoplastic olefin (TPO) foam, a cellular thermoplastic polyester foam, a cellular thermoplastic vulcanizate (TPV) foam, a cellular polyvinyl chloride (PVC) foam, a cellular chlorinated polyethylene foam, a cellular styrene block copolymer foam, a cellular ethylene methyl acrylate (EMA) foam, and a cellular ethylene butyl acrylate (EBA) foam.

4. The unitary composite cushioning structure of claim 1, wherein the cellular thermoplastic material is comprised of a closed cellular thermoplastic material.

5. The unitary composite cushioning structure of claim 1, wherein the density of the cellular thermoplastic material is between ½ lb. per cubic foot ($lb./ft^3$) to 30 lbs./ $ft^3$.

6. The unitary composite cushioning structure of claim 1, wherein the cellular thermoset material is comprised from the group consisting of a polyurethane material, a melamine-formaldehyde material, silicone, a polyester material, natural latex rubber, and synthetic latex rubber.

7. The unitary composite cushioning structure of claim 1, wherein the density of the cellular thermoset material is between 1 lb. per cubic foot ($lb./ft^3$) to 15 lbs./$ft^3$.

8. The unitary composite cushioning structure of claim 1, wherein the cellular thermoset material is comprised from the group consisting of a cellular polyurethane foam, a cellular melamine-formaldehyde foam, a silicone foam, a cellular polyester foam, a cellular natural latex rubber foam, and a cellular synthetic latex rubber foam.

9. The unitary composite cushioning structure of claim 1, further comprising convolutions disposed in a surface of the cellular thermoset material not in contact with the stratum.

10. The unitary composite cushioning structure of claim 1, further comprising at least one filler material mixed into the cellular thermoset material to provide stability to the cellular thermoset material.

11. The unitary composite cushioning structure of claim 10, wherein the at least one filler material is comprised of at least one of core dust, ground foam, nano clay, carbon nano tubes, calcium carbonate, and flyash.

12. The unitary composite cushioning structure of claim 1, further comprising a chemical bonding agent mixed in the cellular thermoplastic material to provide the direct chemical bond between the at least a portion of the cellular thermoplastic material and the at least a portion of the cellular thermoset material.

13. The unitary composite cushioning structure of claim 1, wherein the direct chemical bond is comprised of a cohesive or adhesive bond provided in the stratum to adhere the at least a portion of the cellular thermoplastic material to the at least a portion of the cellular thermoset material.

14. The unitary composite cushioning structure of claim 1, wherein the cellular thermoplastic material is provided in the cellular thermoplastic foam profile having at least one chamber disposed therein, wherein the cellular thermoset material is disposed in the at least one chamber of the cellular thermoplastic foam profile.

15. The unitary composite cushioning structure of claim 14, wherein the at least one chamber is a closed chamber.

16. The unitary composite cushioning structure of claim 14, wherein the at least one chamber is an open chamber.

17. The unitary composite cushioning structure of claim 16, wherein the cellular thermoplastic foam profile is comprised of a C-shaped thermoplastic profile with the open chamber disposed therein.

18. The unitary composite cushioning structure of claim 14, wherein the cellular thermoplastic foam profile is either extruded, molded, casted, or thermally formed.

19. The unitary composite cushioning structure of claim 1 encapsulated in a second cellular thermoplastic material.

20. The unitary composite cushioning structure of claim 1 encapsulated in a second thermoset material.

21. The unitary composite cushioning structure of claim 1 disposed in an assembly comprised from the group consisting of a mattress assembly, a seat assembly, a cushion, a helmet assembly, a mat, a grip, packaging, a side support, an edge support, a bolster, and a coil.

22. The unitary composite cushioning structure of claim 1, wherein the cellular thermoplastic material is comprised of a cellular thermoplastic geometrically designed profile.

23. The unitary composite cushioning structure of claim 22, wherein the cellular thermoset material is disposed in the cellular thermoplastic geometrically designed profile.

24. The unitary composite cushioning structure of claim 1, wherein the cellular thermoplastic material is comprised of an open cellular thermoplastic material.

25. The unitary composite cushioning structure of claim 1, wherein the cellular thermoplastic material is comprised of a partially closed cellular thermoplastic material.

26. The unitary composite cushioning structure of claim 1, further comprising an adhesion promotion agent mixed in the cellular thermoplastic material to provide the direct chemical bond between the at least a portion of the cellular thermoplastic material and the at least a portion of the cellular thermoset material.

27. A mattress assembly for bedding or seating, comprising:
    at least one mattress component comprised of a unitary composite cushioning structure formed from a cellular thermoplastic material and a cellular thermoset material, comprising:
        the cellular thermoplastic material providing support and cushioning characteristics;
        the cellular thermoset material providing a resilient structure with cushioning characteristics; and
        a stratum disposed between at least a portion of the cellular thermoplastic material and at least a portion of the cellular thermoset material formed and defined by a non-solid phase of the cellular thermoset material on a cellular thermoplastic foam profile, wherein the cellular thermoset material undergoes a transition into a solid phase intermixing with and comprising a direct chemical bond with the cellular thermoplastic material to secure the at least a portion of the cellular thermoset material directly to the at least a portion of the cellular thermoplastic material to form the unitary composite cushioning structure exhibiting a combination of the support and cushioning characteristics and the resilient structure with cushioning characteristics when the unitary composite cushioning structure is placed under a load.

28. The mattress assembly of claim 27, wherein the at least one mattress component is comprised from the group consisting of a foundation, a base, an innerspring, a core, at least one edge support, at least one side support, at least one corner support, at least one lumbar support, at least comfort layer, and at least one padding layer.

29. The mattress assembly of claim 27, further comprising at least one channel disposed in the cellular thermoplastic material, wherein the cellular thermoset material is disposed within the at least one channel.

30. The mattress assembly of claim 29, wherein the at least one channel is comprised of at least one open channel.

31. The mattress assembly of claim 29, wherein the at least one channel is comprised of at least one closed channel.

32. The mattress assembly of claim 29, wherein the at least one mattress component is comprised of a plurality of mattress components and the at least one channel is comprised of a plurality of channels,
    wherein a first mattress component of the plurality of mattress components in a first zone includes a first cushioning characteristic and a second mattress component of the plurality of mattress components in a second zone includes a second cushioning characteristic different from the first cushioning characteristic.

33. The mattress assembly of claim 32, wherein the at least one mattress component includes at least one horizontal mattress component.

34. The mattress assembly of claim 32, wherein the at least one mattress component includes at least one vertical mattress component.

35. The mattress assembly of claim 32, wherein the first mattress component provides lumbar support.

36. The mattress assembly of claim 32, wherein the at least one mattress component is comprised of a coil-shaped profile to provide spring-like cushioning properties.

37. The mattress assembly of claim 36, wherein the coil-shaped profile is comprised of a cylindrical-shaped profile of the cellular thermoplastic material having a chamber disposed therein, and the cellular thermoset material is disposed in the chamber, such that the stratum is disposed between an inner surface of the cylindrical-shaped profile and an outer surface of the cellular thermoset material.

38. The mattress assembly of claim 27, further comprising at least one filler material mixed into the cellular thermoset material to provide stability to the cellular thermoset material.

39. The mattress assembly of claim 38, wherein the at least one filler material is comprised of at least one of core dust, ground foam, nano clay, carbon nano tubes, calcium carbonate, and flyash.

* * * * *